(12) United States Patent
Brister

(10) Patent No.: US 6,397,791 B1
(45) Date of Patent: Jun. 4, 2002

(54) SAFETY FUEL TANK AND FILLER CAP APPARATUS

(76) Inventor: Charles Brister, 505 Ellis Rd., Amite, LA (US) 70422

( * ) Notice: Subject to any disclaimer, the term of this patent is extended or adjusted under 35 U.S.C. 154(b) by 0 days.

(21) Appl. No.: 09/655,033

(22) Filed: Sep. 5, 2000

Related U.S. Application Data

(63) Continuation-in-part of application No. 09/452,653, filed on Dec. 1, 1999, now Pat. No. 6,260,516, which is a continuation-in-part of application No. 09/288,402, filed on Apr. 8, 1999, now Pat. No. 6,112,714, which is a continuation-in-part of application No. 09/267,877, filed on Mar. 11, 1999, now abandoned.

(51) Int. Cl.$^7$ .................................................. F01P 9/02
(52) U.S. Cl. ................................ 123/41.15; 123/198 D
(58) Field of Search ........................... 123/41.15, 41.54, 123/198 D

(56) References Cited

U.S. PATENT DOCUMENTS

| 416,103 | A | 11/1889 | Harter | |
|---|---|---|---|---|
| 1,117,741 | A | 11/1914 | Wood, Jr. | |
| 2,598,067 | A | 5/1952 | O'Brien | 110/18 |
| 3,057,140 | A | 10/1962 | Ridenour et al. | 56/25.4 |
| 3,387,874 | A | 6/1968 | Holtkamp | 292/201 |
| 3,390,909 | A | 7/1968 | Nagel | 292/201 |
| 3,568,421 | A | 3/1971 | Smith et al. | 56/255 |
| 3,664,698 | A | 5/1972 | Stropkay | 292/201 |
| 3,750,378 | A | 8/1973 | Thorud et al. | 56/10.5 |
| 3,795,417 | A | 3/1974 | Cohen | 292/144 |
| 3,885,547 | A | 5/1975 | Doepke et al. | 123/198 |
| 3,942,604 | A | 3/1976 | Black, III | 180/103 R |
| 3,969,875 | A | 7/1976 | Nofel | 56/10.2 |
| 4,236,494 | A | 12/1980 | Fairchild | 123/630 |
| 4,277,094 | A | 7/1981 | Roue | 296/1 |
| 5,044,678 | A | 9/1991 | Detweiler | 292/144 |
| 5,551,866 | A | 9/1996 | Josephs et al. | 123/198 D |
| 6,260,516 | B1 * | 7/2001 | Brister | 123/41.15 |

* cited by examiner

Primary Examiner—John Kwon
(74) Attorney, Agent, or Firm—Garvey, Smith, Nehrbass & Doody, LLC; Charles C. Garvey, Jr.

(57) ABSTRACT

In one embodiment disclosed is a safety fuel tank and filler cap apparatus for supplying fuel to an internal combustion engine that can be started with a magnetoelectric generator, comprising an exposed fuel tank having a fill opening, an annular fuel filler flange surrounded by an adjoining fuel tank wall having outer surface, said flange having a central axis; a filler cap having a cap center, the cap being connectable to the fuel filler flange to form a closure of the tank at the fill opening when the cap center generally aligns with the flange central axis, said filler cap and adjoining fuel tank outer surface being configured to enable a user to grip and turn said fuel filler cap, at a position next to the tank wall; and a mechanism interfaced between the fuel tank and filler cap that is activated to a safety mode when the engine is at an elevated, operating temperature, said mechanism including a connector that interfaces between the outer surface of the fuel tank and the cap. In another embodiment disclosed is a powered implement, comprising: a frame; an internal combustion engine mounted on the frame, said engine including a magnetoelectric generator for starting the engine; the frame and engine supporting an exposed fuel tank having a tank wall and a fill opening through said tank wall for receiving fuel for powering the engine; a fuel filler flange on said tank surrounded by an adjoining fuel tank outer surface, said flange extending a short distance from tank wall and surrounding the filler opening; a filler cap that fits the fuel filler flange to form a closure of the tank at the fill opening, said filler cap and adjoining fuel tank outer surface being configured to enable a user to grip and turn said fuel filler cap; and a device interfaced between the fuel tank and filler cap that responds to an attempt by a user to open the filler cap when the engine is at an elevated, operating temperature that is near the ignition temperature of the fuel that powers the engine.

23 Claims, 19 Drawing Sheets

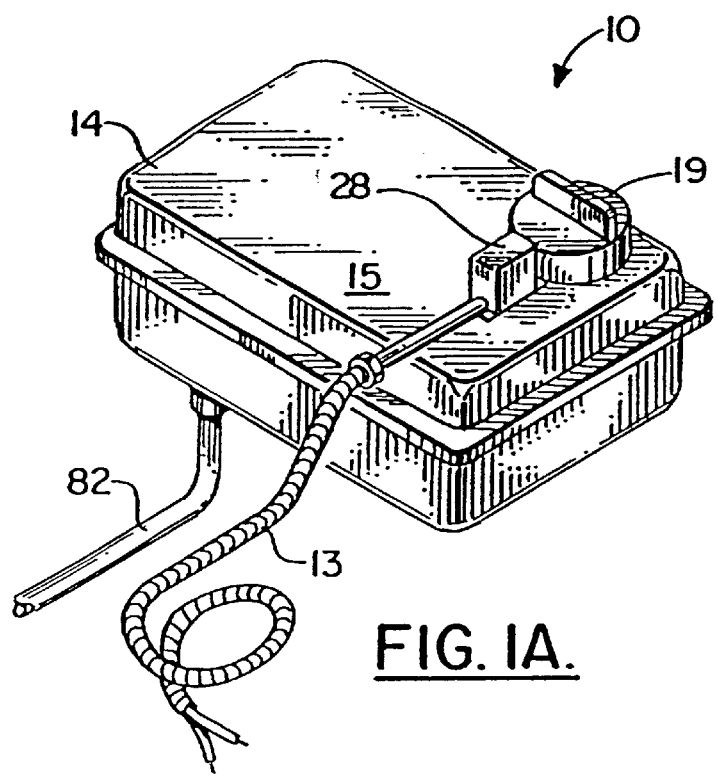
FIG. IA.
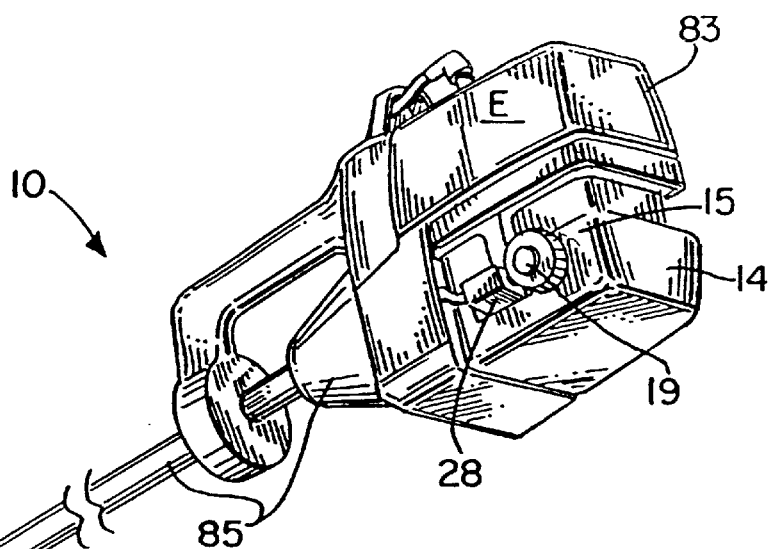
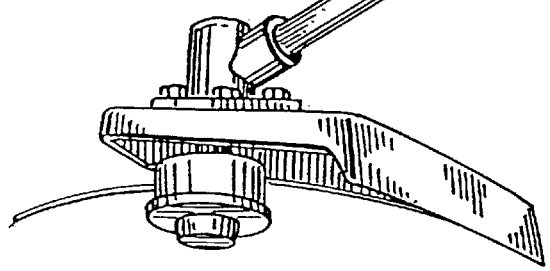
FIG. IB.

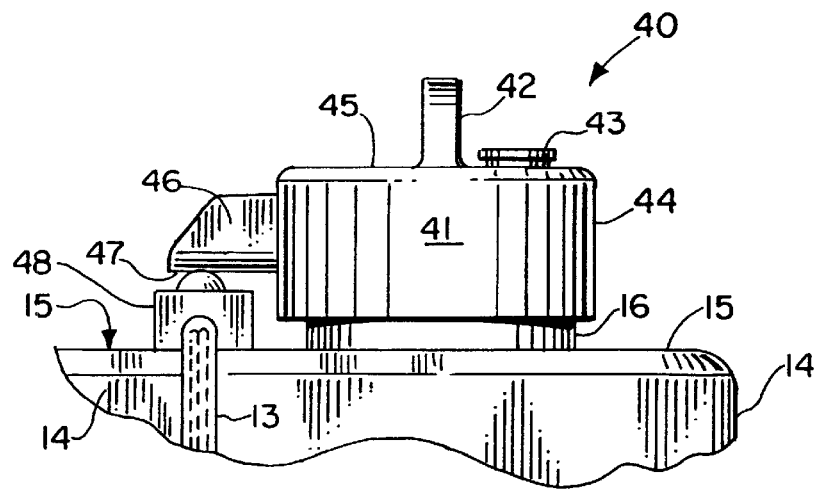
FIG. 4.
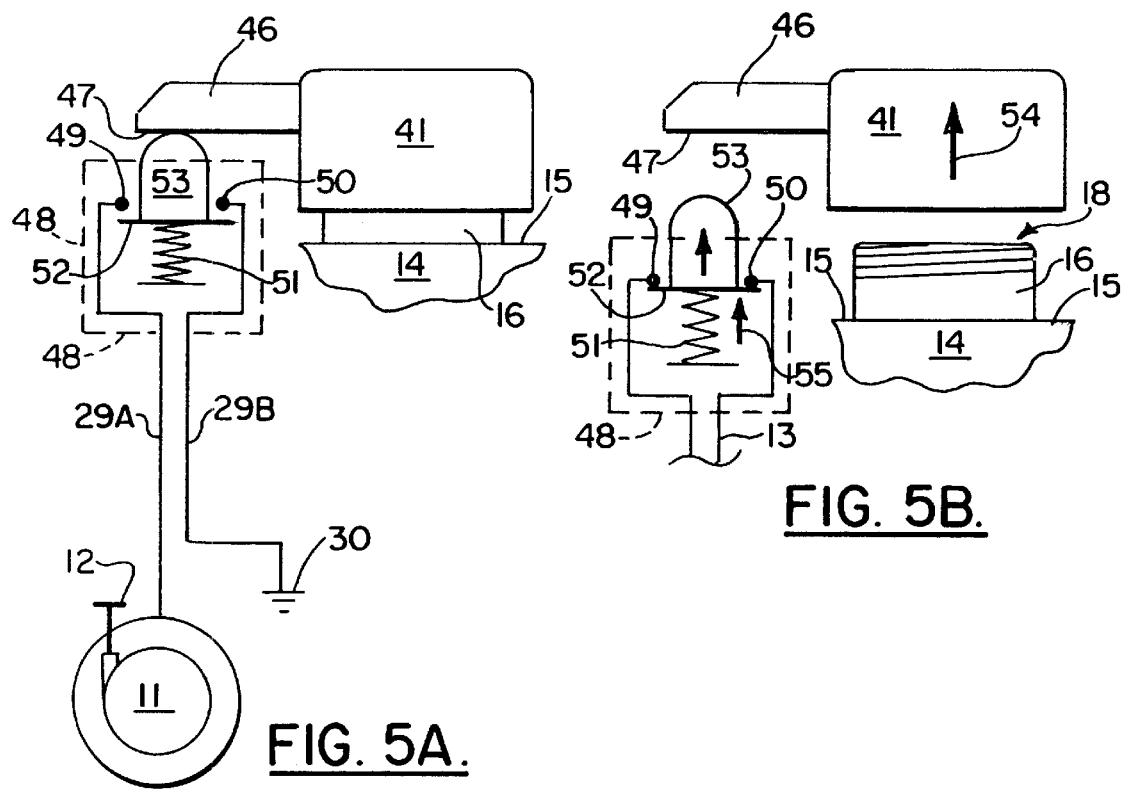
FIG. 5B.
FIG. 5A.

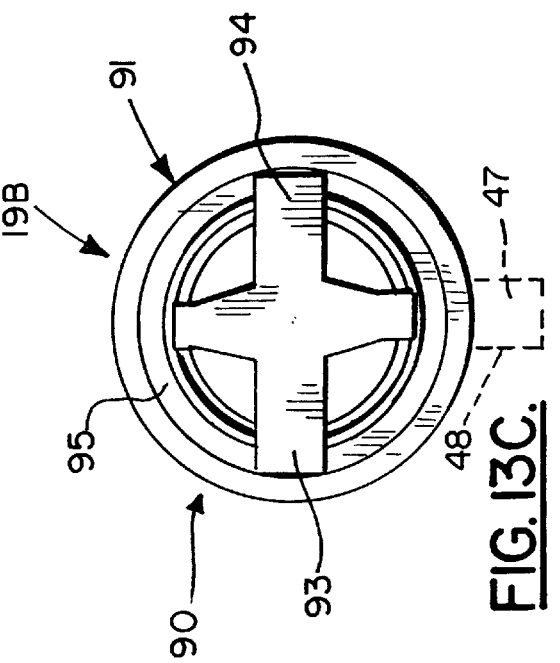
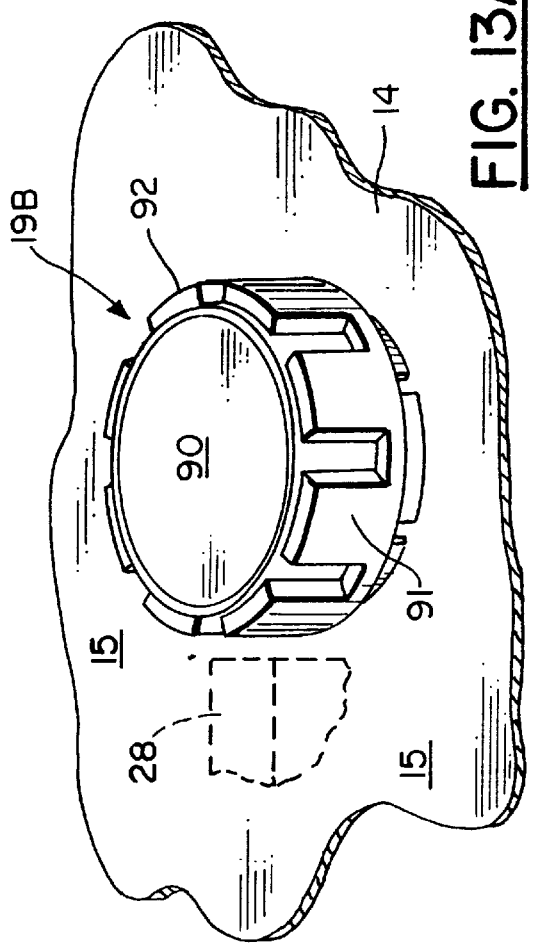
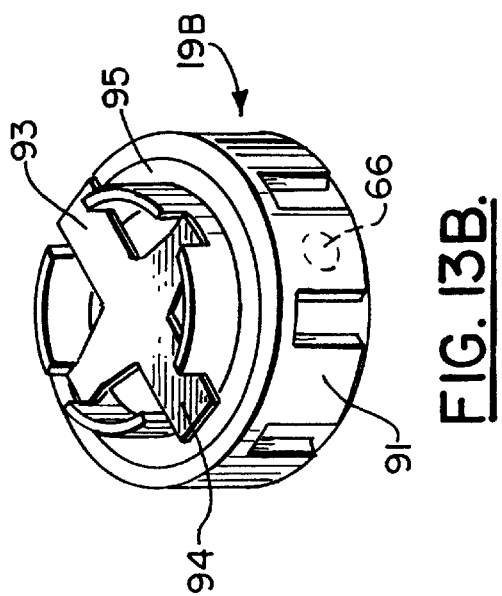

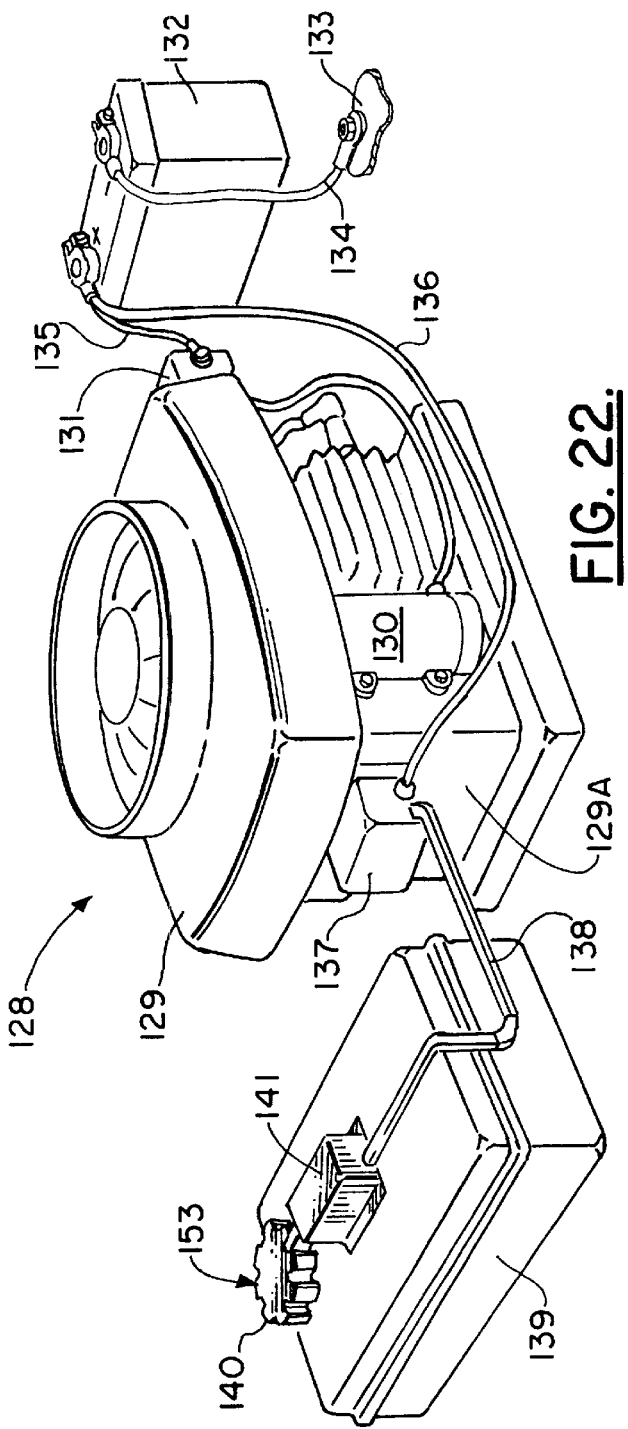
FIG. 22.
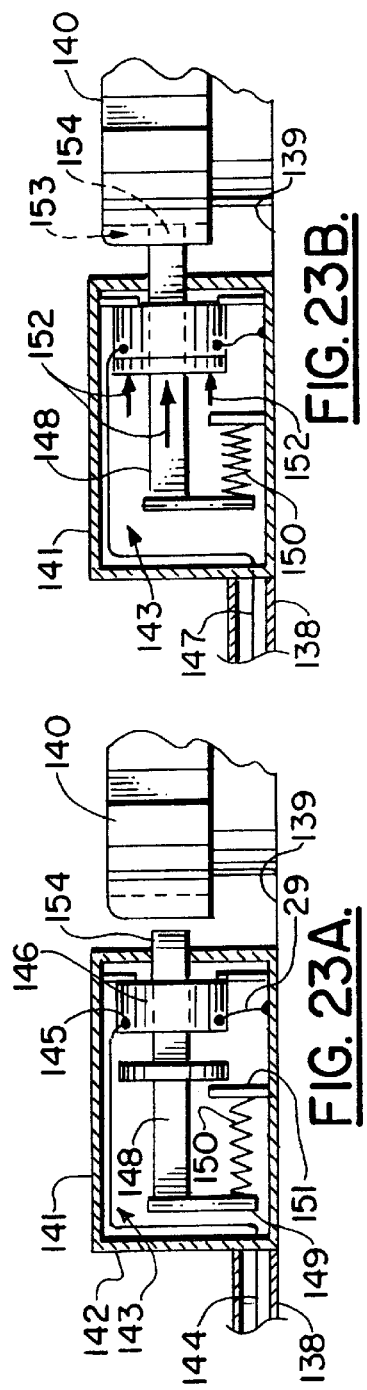
FIG. 23A.
FIG. 23B.

SAFETY FUEL TANK AND FILLER CAP APPARATUS

CROSS-REFERENCE TO RELATED APPLICATIONS

This is a continuation in part of U.S. Ser. No. 09/452,653 filed Dec. 1, 1999 (now U.S. Pat. No. 6,260,516) which is a continuation-in-part of U.S. Ser. No. 09/288,402 filed Apr. 8, 1999 (now U.S. Pat. No. 6,112,714) which is a continuation-in-part of U.S. Ser. No. 09/267,877, filed Mar. 11, 1999 (now abandoned). Priority to all three applications is claimed and all are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to small internal combustion engines of the type that are used to power lawn mowers, tillers, lawn vacuums, weed trimmers, snow blowers, water blasters and the like. Even more particularly, the present invention relates to an improved safety fuel tank and filler cap apparatus which enters a safety mode and alerts a user who grasps and turns the fuel cap (or when the fuel cap loosens) that gasoline should not be added to the fuel tank when various conditions exist. In one embodiment the apparatus automatically disables the magnetoelectric generator when a fuel filler cap portion of the apparatus is separated from a fuel filler flange such as when the fuel filler cap inadvertently disconnects from the fuel tank or is removed for filling the fuel tank. In another embodiment, the safety fuel tank and filler cap apparatus disallows removal of the fuel filler cap portion of the apparatus from the fuel tank when the engine is too hot, such as above a selected safe threshold temperature value.

2. General Background of the Invention

The flash point of a liquid such as gasoline should not be confused with the temperature necessary to ignite the vapors, for unless a source of heat considerably hotter than the flash point of the fuel comes into direct contact with the vapors, the fuel will merely give off vapors without burning. An essential factor in the process of combustion is oxygen. Without oxygen, even the most flammable vapors will not combust. Under normal conditions, a flame draws the amount of oxygen necessary to sustain combustion from the air. When the oxygen content of the air falls below about 15%, there is an immediate extinguishment of practically all flames.

There is typically a wide temperature difference between the flash point of a fuel and the ignition temperature. For example, the flash point (vapor given off) of gasoline is minus 43 degrees centigrade (minus 45.4 degrees Fahrenheit), and the ignition temperature (heat necessary to ignite the mixture) is about 257 degrees centigrade (494.6 degrees Fahrenheit). A small flame can be drawn into lube oil which is at average room temperature and it will not burn, but with the addition of burning gasoline, vapors soon rise and burn to raise the temperature of the surrounding oil to the flash point.

Every year, fires cause serious and sometimes fatal bodily injury to operators of outdoor, yard and garden, and like implements such as lawn mowers, lawn vacuums, weed trimmers, water blasters, and the like. One of the most common safety problems is associated with the attempt by individuals to add gasoline to the internal combustion engine of a lawn mower or like implement that is still running. Sometimes, an implement gradually loosens the gas filler cap because of vibration. Typically, these implements position the fuel tank and its filler neck at or near the engine block.

Fuel that spills from the fuel tank or from a supply container when filling the tank may come into contact with hot surfaces on the engine block or accessories. If the user is not paying close attention to the gas tank and its filler cap, gasoline can begin to leak when the cap is loosened. This problem is especially acute with rear drive type implements such as all terrain vehicles, go-karts, riding lawn mowers and lawn tractors wherein the gasoline tank may be behind the operator or underneath a seat or hood preventing the user from seeing it. Many tractor style riding lawn mowers have such a hidden fuel tank and filler cap.

Many of these implements are operated by adolescent children that are not warned sufficiently by their parents about the danger of filling tanks with gasoline when the implement or vehicle is hot from operation.

Many manufacturers use decal warning stickers and user's manual warnings to warn a user to not remove the fuel filler cap until the engine cools for at least a couple of minutes.

Despite warnings, many users smoke when operating such an implement, so that if the cap loosens, the operator does not notice the escape of fumes if the engine continues to run.

Generators are often filled with gasoline by a user when still running because the user does not want to interrupt the flow of electricity.

All of the above situations are hazardous if the engine continues to run when the filler cap is removed or becomes removed, or if a user attempts to fill the fuel tank when the engine is very hot.

BRIEF SUMMARY OF THE INVENTION

The present invention provides an improved safety fuel tank and filler cap apparatus for supplying fuel to an implement powered by an internal combustion engine that can be started with a magnetoelectric generator. The implement can be, for example, a lawn mower, go-kart, garden tractor, lawn vacuum, snow blower, tiller, chain saw, weed trimmer, hedge clipper, or log splitter.

The apparatus includes an exposed fuel tank having a fill opening, a fuel filler flange surrounded by an adjoining fuel tank outer surface, the flange extending a short distance from the filler opening in the fuel tank wall. A filler cap fits the fuel filler flange to form a closure of the tank at the fill opening, the filler tank and adjoining fuel tank outer surface being configured to enable a user to grip and turn the fuel filler cap. A switch is interfaced between the fuel tank and filler cap that disables the magnetoelectric generator when the filler cap is removed from the fuel filler tank. This construction prevents the user from filling the fuel tank with gasoline when the engine is running.

The switch can be a magnetic switch, a photoelectric switch, or a mechanical switch, for example a button switch, toggle switch, rocker switch. The mechanical switch can be a switch that moves between operating and disabled positions, the switch including a moving member that shifts positions when the fuel filler cap is separated from the fuel filler flange.

The switch can include a magnetic switch member mounted in the fuel tank and another magnetic switch member mounted on the filler cap. The switch can include a switch member mounted on the filler cap the does not interfere with the sealing of the fuel filler flange with the filler cap, being spaced from the threads or bayonet connectors that join the cap and tank.

The filler cap can have a top, an annular skirt with internal threads, and wherein the switch member is mounted on the annular skirt in between the threads and the top. Such internal threads form a threaded engaged connection with external threads on the fuel filler flange. The fuel filler cap preferably has a top, an annular skirt with a threaded portion thereon, and an unthreaded outer surface and wherein the switch member is mounted on the annular skirt. The switch member can be mounted on an unthreaded portion of the filler cap.

In another embodiment, the present invention provides an improved safety fuel tank and filler cap apparatus for supplying fuel to an internal combustion engine that includes an exposed fuel tank having a fill opening, a fuel filler flange surrounded by an adjoining fuel tank outer surface, the flange extending a short distance from the filler opening in the fuel tank wall. A filler cap fits the fuel filler flange at the fill opening, the filler tank and adjoining fuel tank outer surface being configured to enable a user to grip and turn the fuel filler cap. A locking mechanism is interfaced between the fuel tank and filler cap that disallows removal of the filler cap. This construction prevents the user from filling the fuel tank with gasoline when the engine is still running or not running but still very hot.

The present invention also teaches and provides a powered implement having a frame, an internal combustion engine mounted on the frame that includes a magnetoelectric generator for starting the engine, and including an exposed fuel tank having a fill opening, a fuel filler flange surrounded by an adjoining fuel tank outer surface, the flange extending a short distance from the filler opening in the fuel tank wall and wherein a filler cap fits the fuel filler flange to form a closure of the tank at the fuel opening.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1A is perspective view of the preferred embodiment of the apparatus of the present invention used with an auxiliary tank;

FIG. 1B is a perspective view of the preferred embodiment of the apparatus of the present invention showing a powered implement in the form of a weed trimmer;

FIG. 4 is a side elevational view of a second embodiment of the apparatus of the present invention;

FIGS. 5A–5B are schematic sectional elevational views of the second embodiment of the apparatus of the present invention showing the switch in engine operating (FIG. 5A) and engine disabled (FIG. 5B) positions respectively;

FIGS. 13A, 13B and 13C are upper perspective, bottom perspective, and bottom views respectively of another filler cap construction having a bayonet mount that can be used with the embodiment of FIGS. 1–11;

FIG. 22 is a perspective view of a sixth embodiment of the apparatus of the present invention;

FIG. 23A is a fragmentary elevational view of the sixth embodiment of the apparatus of the present invention;

FIG. 23B is a fragmentary view of the sixth embodiment of the apparatus of the present invention shown in locking position;

DETAILED DESCRIPTION OF THE INVENTION

Figure 1:
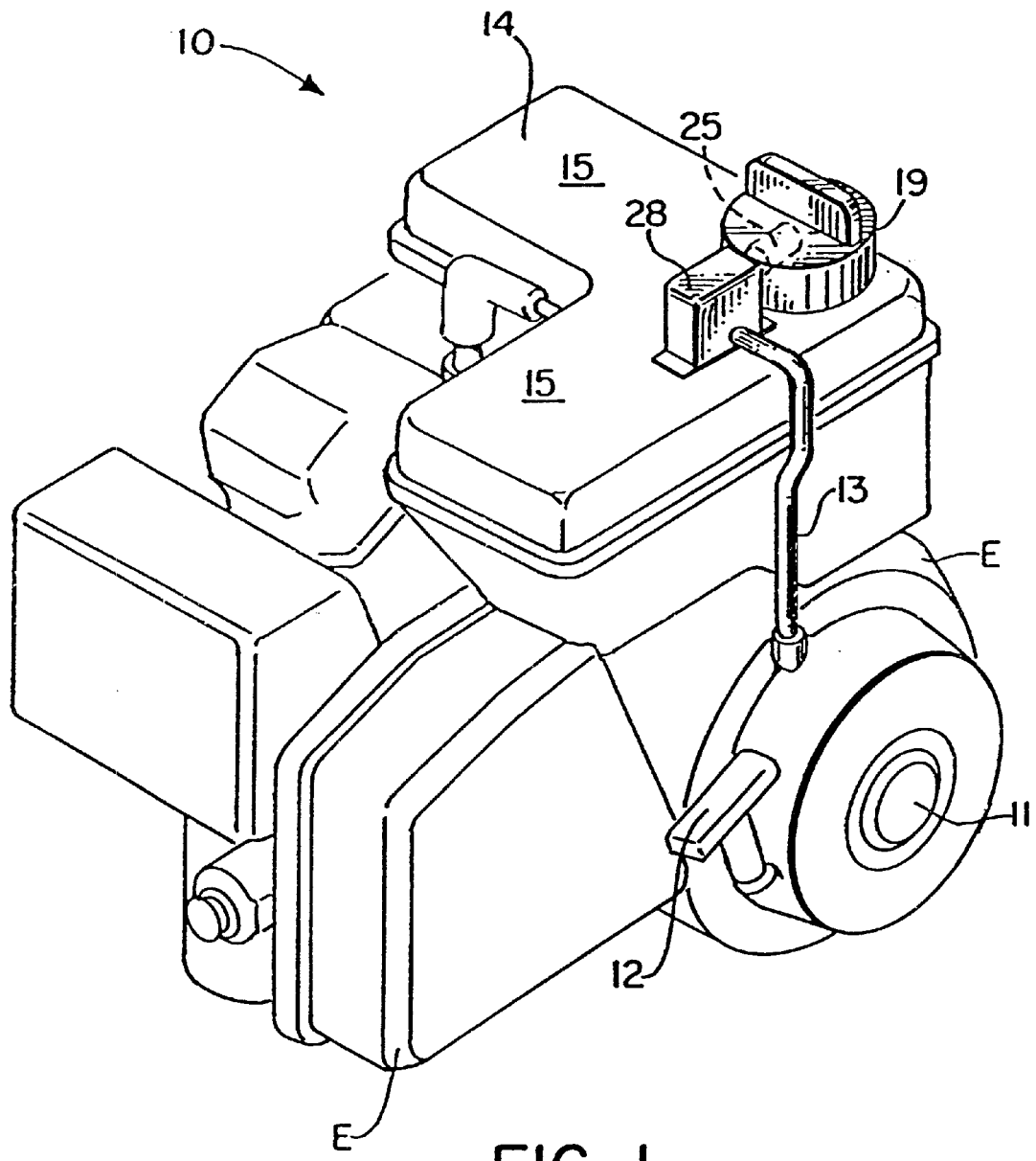
FIG. 1 is a perspective view of the preferred embodiment of the apparatus of the present invention.

FIGS. 1, 1A and 1B show the preferred embodiment of the apparatus of the present invention designated generally by the numeral 10 in FIGS. 1, 1A and 1B.

Safety fuel tank and cap apparatus 10 includes a safety system that disables internal combustion engine E if a user removes the fuel filler cap 19 from cylindrically shaped flange 16 of fuel tank 14. Engine E can be any small two stroke or four stroke engine for operating a lawnmower, tiller, weed trimmer, chainsaw, generator, go-kart, or the like. Engine E can be a type that includes a magnetoelectric generator 11 that can be operated with an electric starter (not shown) or a pull cord starter rope 12. In one embodiment of the present invention, electrical circuit 13, 28 is provided for disabling magnetoelectric generator 11 when filler cap 19 is removed from fuel tank 14. An electrical cable 13 extends between a switch 28 mounted on the upper surface 15 of fuel tank 14 and the magnetoelectric generator or "magneto" 11.

Figure 2:
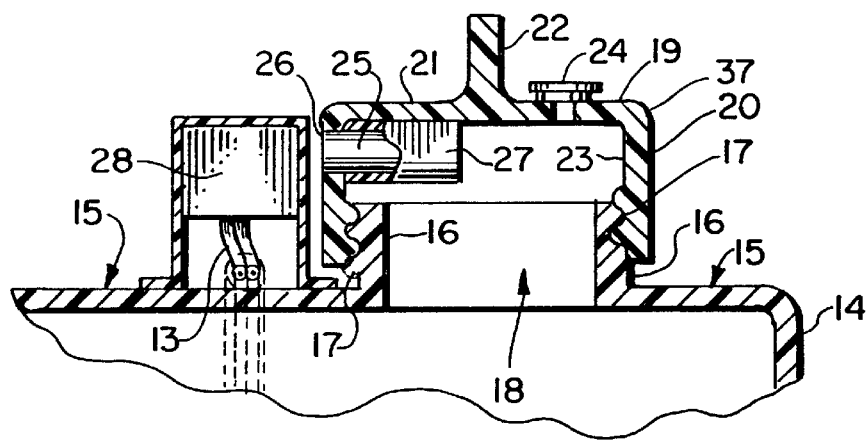
FIG. 2 is a partial sectional elevational view of the preferred embodiment of the apparatus of the present invention.

The fuel filler cap 19 in FIG. 2 provides an internally threaded portion 23 that interlocks with external thread 17 on cylindrically shaped flange 16. The cylindrically shaped flange 16 surrounds fuel tank opening 18.

Filler cap 19 is comprised of a circular top portion 21 and a generally cylindrically shaped annular skirt 20. The top portion 21 is joined to the skirt 20 at annular edge 37. Skirt 20 has an inner annular, generally cylindrically shaped surface 20A and an outer annular generally cylindrically shaped surface 20B. Skirt 20 outer surface 20B can be knurled or ribbed to ease gripping by a user. Inner surface 20B can be threaded (see FIGS. 2, 3A–3B, 5A–5B) or a bayonet mount (see FIGS. 14–15). Handle 22 is positioned on top 21 for enabling a user to remove cap 19 from flange 16 or for engaging cap 19 with flange 16. The cap 19 can include a vent 24 for releasing fumes.

The filler cap 19 can be an internally threaded cap as shown in FIGS. 1–11. Alternatively, the filler cap can be a bayonet type cap 19A, 19B as shown in FIGS. 12A, 12B, 12C, 13A, 13B and 13C. Such a bayonet mount type cap 19A, 19B is used on engines such as those sold under the marks Honda® and Briggs® for example.

A magnet 25 is embedded in the unthreaded upper portion of cap 19 next to top 21 as shown in FIG. 2. Magnet 25 provides an outer end 26 that is positioned next to the annular skirt 20. The inner end 27 of magnet 25 is positioned nearer the center of circular top as show in FIG. 2.

Figures 3A, 3B:
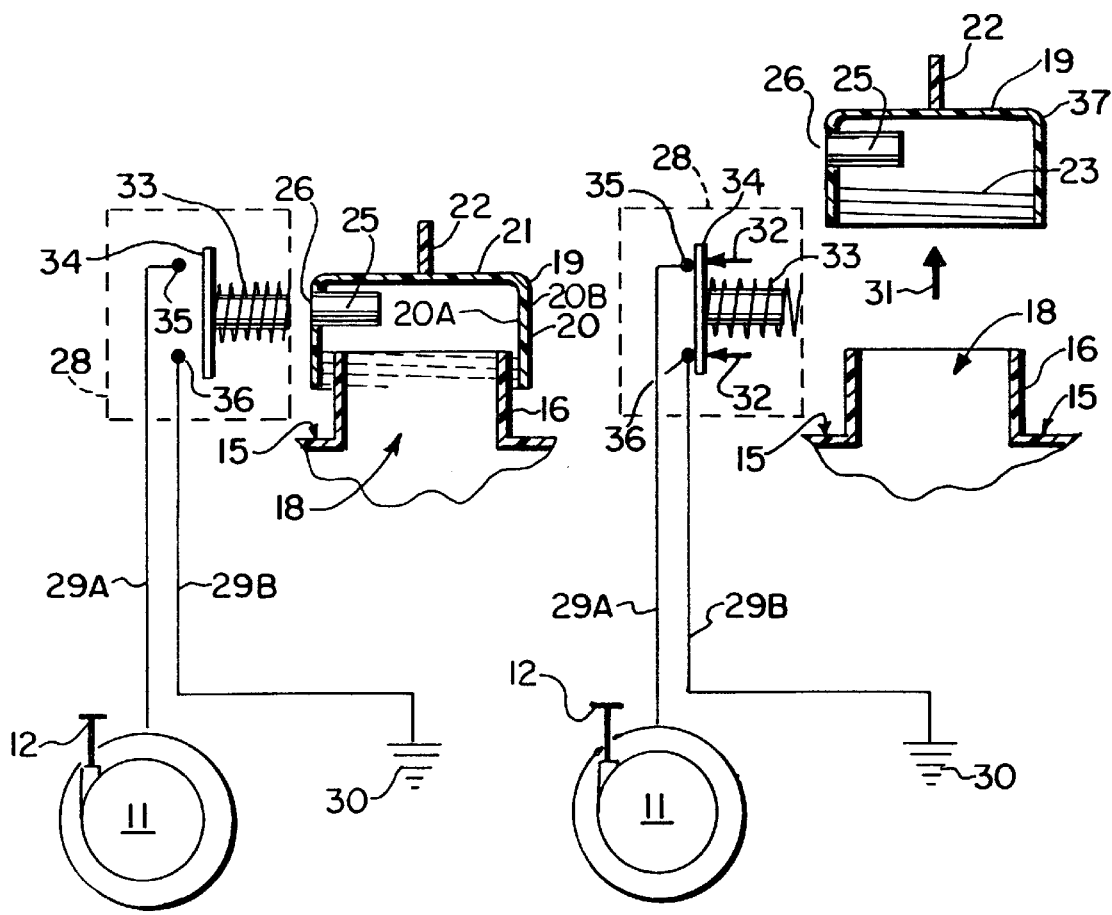
FIGS. 3A–3B are schematic diagrams of the preferred embodiment of the apparatus of the present invention shown in engine operating (FIG. 3A) and engine disabled (FIG. 3B) positions.

Switch 28 is preferably a magnetic member that is mounted on upper surface 15 of fuel tank 14 adjacent to cylindrically shaped flange 16. Magnetic switch 19 includes an electrical cable 29 that communicates with electrical cable 13 extending to magneto 11. The electrical cable 13 can include a pair of wire leads 29A, 29B as shown in FIGS. 3A, 3B. Lead 29B connects to ground 30 as shown in FIGS. 3A, 3B.

In FIG. 3A, the magnet 25 is shown with its outer end 26 positioned next to magnetic switch 28. Spring 33 is overcome by magnet 25 so that it pulls contact plate 34 toward magnet 25 and away from contact points 35, 36. This condition shown in FIG. 3A occurs when the gas filler cap 19 is in a fully closed position. In this closed position, the magnet 25 is generally aligned with the magnetic switch 28 as shown in FIGS. 1, 1A, 1B, 2 and 3A.

In FIG. 3B, a user has separated the gas filler cap 19 from cylindrically shaped flange 18 as indicated schematically by arrow 31. In such a situation, the spring 33 forces contact plate 34 into contact with leads 35,36. Arrows 32 in FIG. 3B indicate schematically the movement of contact plate 34 into contact with points 35, 36. In such a situation, electrical power generated by the magneto is unable to start the engine E.

In FIGS. 4, 5A and 5B, there is shown a second embodiment of the apparatus of the present invention designated generally by the numeral 40 in FIG. 4. Safety fuel tank and cap apparatus 40 includes a cap 41 having a handle 42. Cap 41 can also provide a vent 43. The cap 41 is comprised of a generally cylindrically shaped annular skirt 44 and a circular top 45.

An appendage 46 extends radially outwardly of skirt 41 as shown in FIGS. 4, 5A and 5B. The appendage 46 has an under surface 47 that engages switch button 53 of button switch 48. The button switch 48 is shown in FIG. 5A in an operating position wherein appendage 46 holds the button 53 in a lowermost position that spaces contact plate 52 away from contacts 49, 50. As shown in FIG. 5B when cap 41 is removed from cylindrically shaped filler flange 16 as shown by arrow 54, the spring 51 moves switch button 53 upwardly so that contact plate 52 engages contacts 49, 50 as shown by arrow 55. In such a situation, the magneto 11 will not start the engine E.

Figure 6:
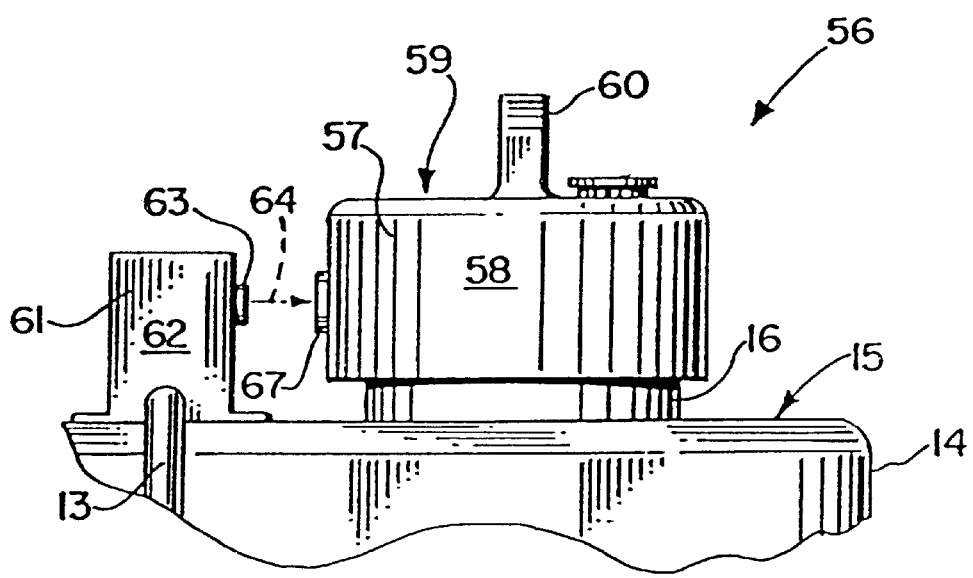
FIG. 6 is an elevational view of a third embodiment of the apparatus of the present invention.
Figure 7:
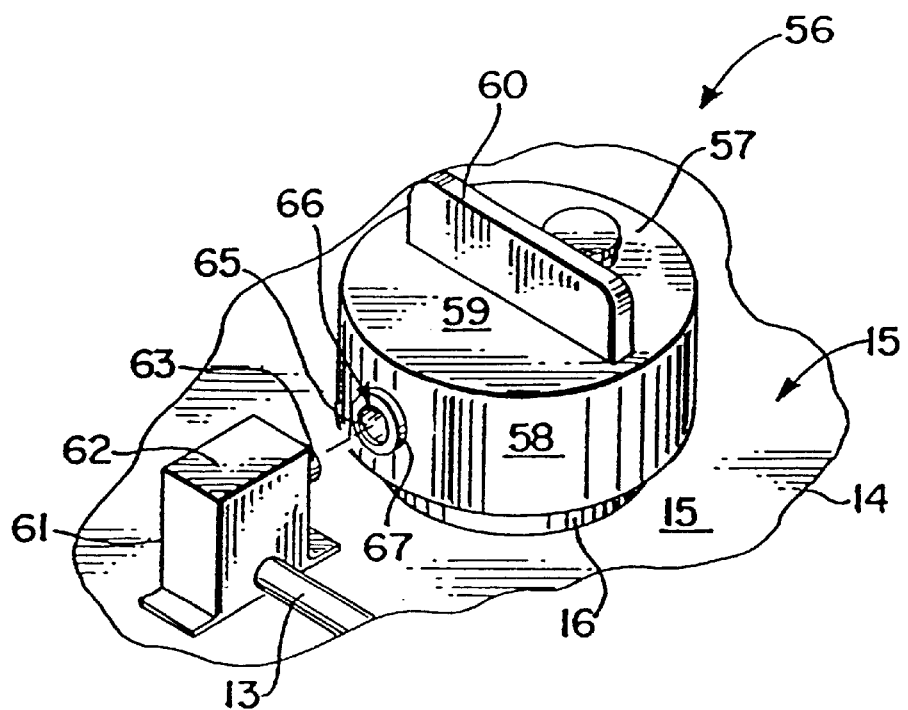
FIG. 7 is a perspective view of the third embodiment of the apparatus of the present invention.

FIGS. 6 and 7 show a third embodiment of the apparatus of the present invention designated generally by the numeral 56 in FIG. 7. Safety fuel tank and cap apparatus 56 features a filler cap 57 that is threadably engagable with annular skirt 16 as with the embodiments of FIGS. 1–5. Annular skirt 58 connects to a circular top 59 having handle 60. Switch 61 is mounted on the upper surface 15 of tank 14 as shown in FIGS. 6 and 7. The switch 61 includes a switch housing 62 that carries an electric eye 63. Such a switch 61 is commercially available. Arrow 64 in FIG. 7 indicates the communication between electric eye 63 and reflector 65 contained in opening 66 surrounded by annular rib 67. In the embodiment of FIG. 6 and 7, the electric eye is emitting a light source that reflects off reflector 65 and which is interrupted when cap 57 is removed from flange 16 so that the electrical cable 13 communicating with magneto 11 closes a circuit that prevents operation of magneto 11 to start engine E.

Figure 8:
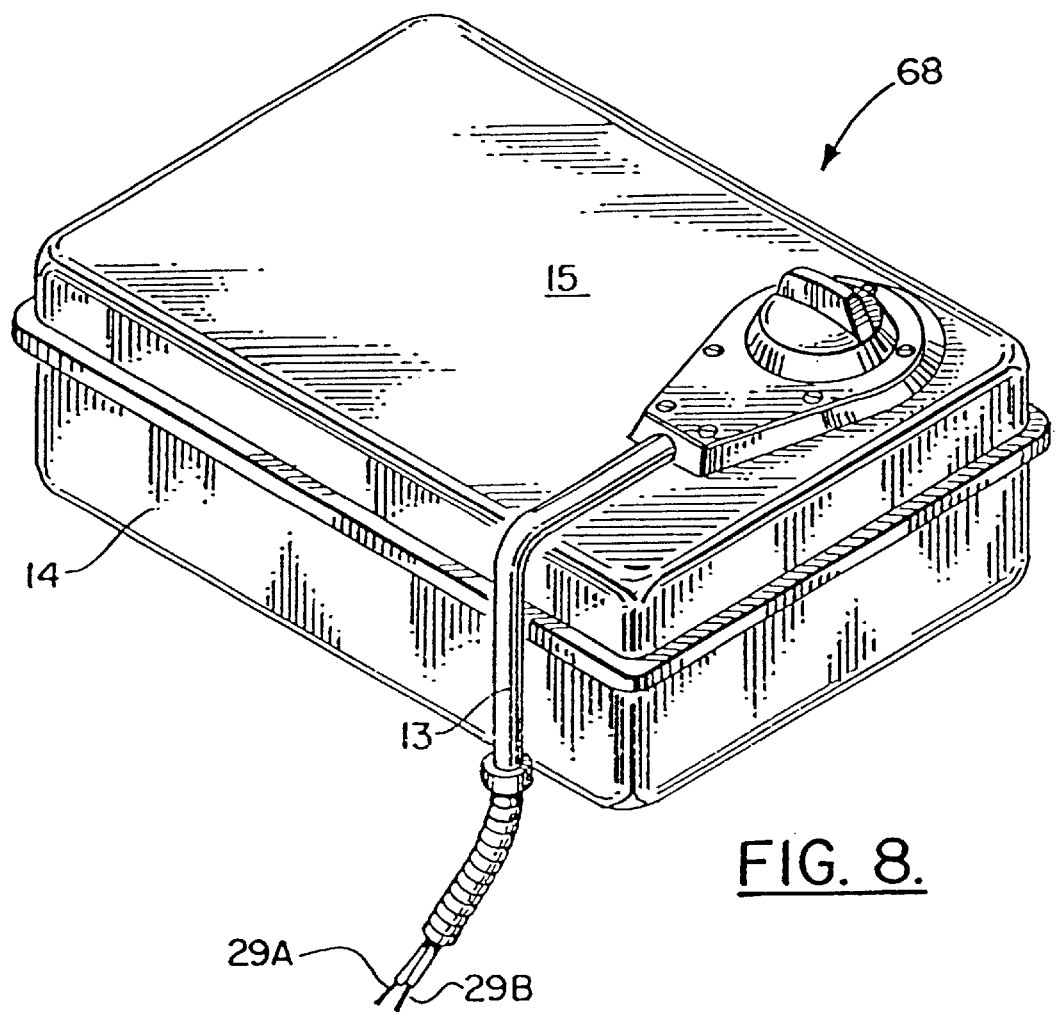
FIG. 8 is a perspective view of a fourth embodiment of the apparatus of the present invention.

FIGS. 8–11 show a fourth embodiment of the apparatus of the present invention designated generally by the numeral 68 in FIG. 8. Safety fuel tank and cap apparatus 68 includes a micro switch 69 having a switch arm 70 that includes a ring 71. The ring 71 surrounds opening 72 that fits over flange 16 and under filler cap 74 as shown in FIGS. 8–11. The ring 71 attaches to micro switch 69 with beam 73. Such a micro switch 69 is commercially available.

Figure 10:
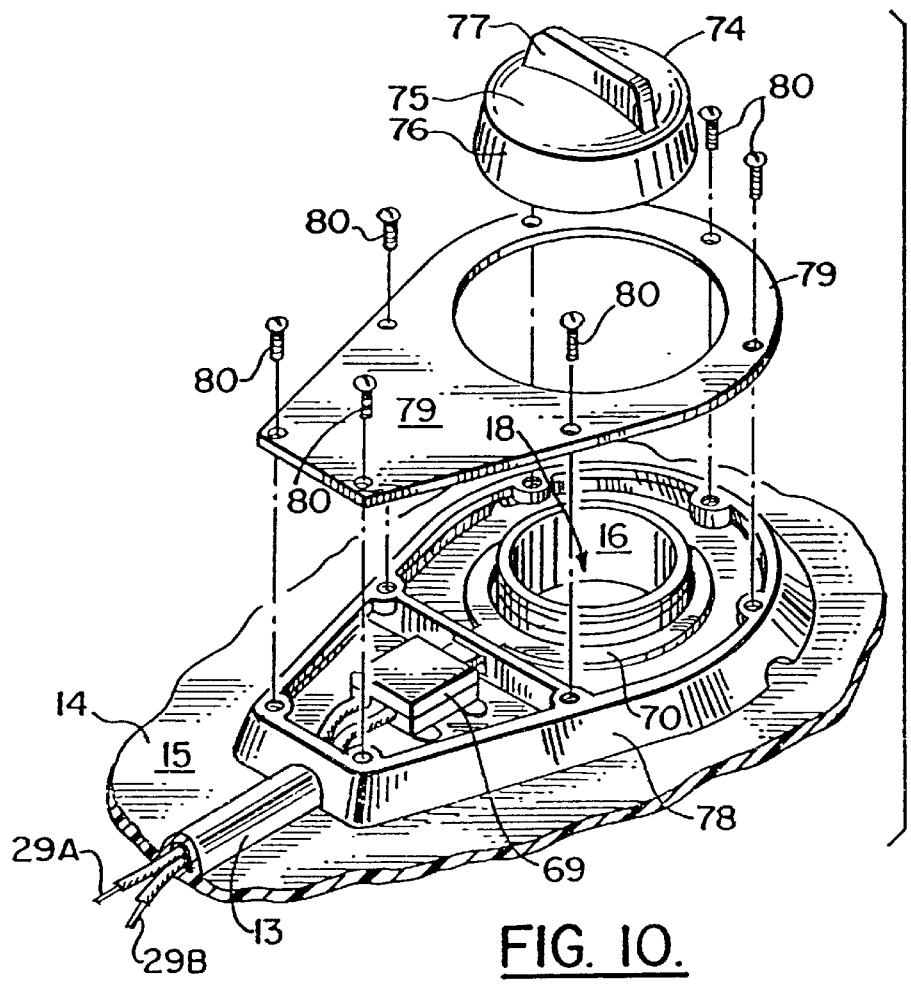
FIG. 10 is an exploded perspective view of the fourth embodiment of the apparatus of the present invention.
Figure 11:
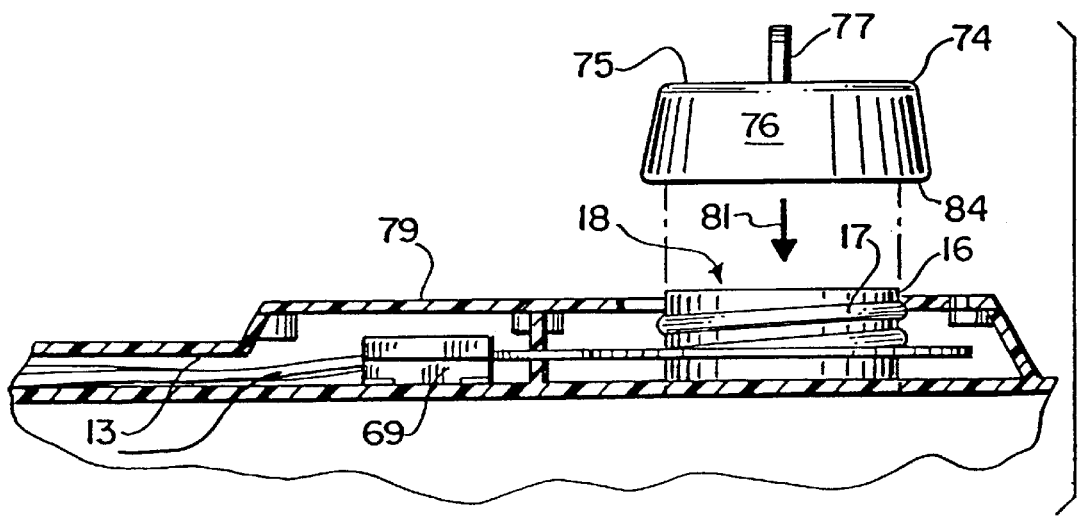
FIG. 11 is a sectional elevational, exploded view of the fourth embodiment of the apparatus of the present invention.

Filler cap 74 has a circular top 75 and a cylindrically shaped annular skirt 76. Handle 77 enables cap 74 to be able to be manipulated and turned such as when it is removed from or engaged with cylindrically shaped flange 16. A shroud 78 is provided for covering the combination of the micro switch 69 and its arm 70 as shown in FIGS. 10 and 11. The shroud 78 communicates with cover 79 that can be bolted over the shroud 78 using a plurality of bolts 80. Arrow 81 in FIG. 11 shows how the micro switch 69 is closed when the cap 74 is threaded upon flange 16 as indicated schematically by arrow 81 in FIG. 11. In such a situation, the lower annular edge 84 of cap 74 engages ring 71 of switch arm 70 forcing it downwardly and operating switch 69 to deactivate magneto 11 via electrical cable 13.

FIG. 1A shows the apparatus 10 of the present invention attached to an auxiliary fuel tank 14 having a fuel line 82. In FIG. 11B, a powered implement is shown in the form of a weed trimmer that includes a frame 85 that supports an internal combustion engine E having fuel tank 14 and filler cap 19 with magnetic switch 28.

Figure 12C:
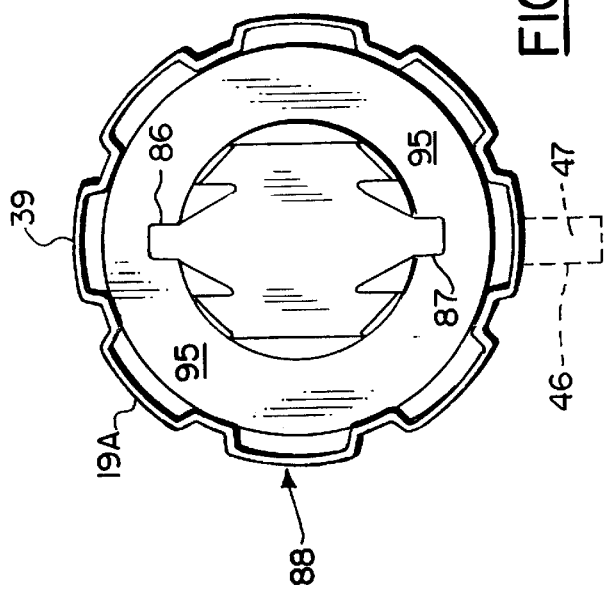
FIGS. 12A, 12B, 12C are upper perspective, bottom perspective, and bottom views respectively of a filler cap construction having a bayonet type mount and that can be used with the embodiments of FIGS. 1–11.
Figure 12A:
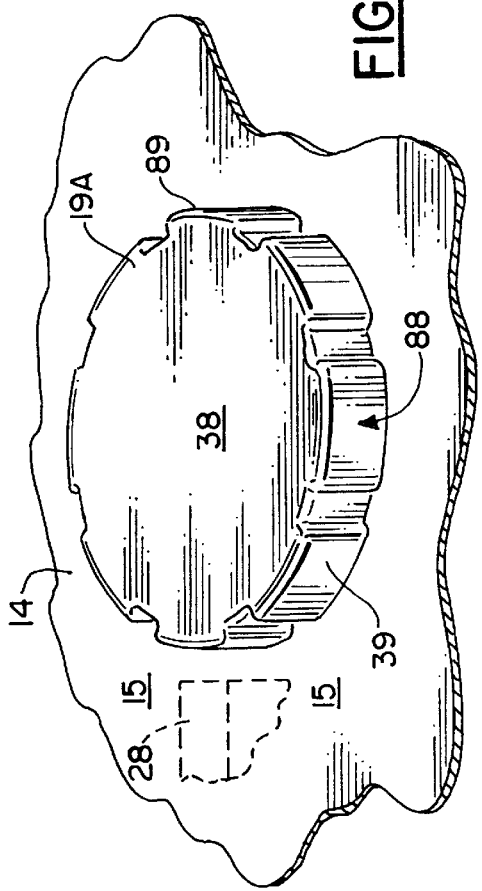
Figure 12B:
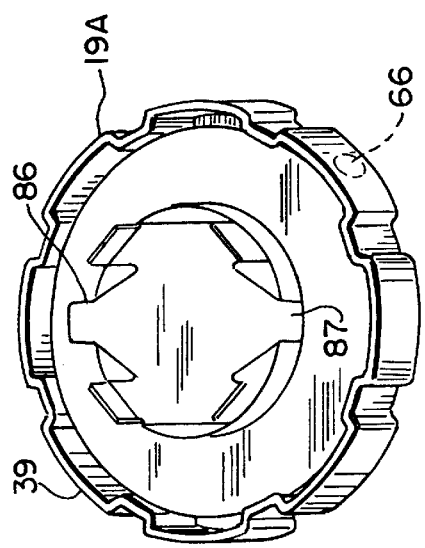

Filler cap 19A in FIGS. 12A, 12B and 12C is a Honda® type cap that can have a circular top 38, annular skirt 39 with generally cylindrically shaped outer surface 88, and annular edge 89 at the interface between top 38 and skirt 39. Cap 19A includes bayonet mount projections 86, 87 that interlock with a bayonet type flange (not shown on tank 14). Cap 19A can have gasket 95. Such an interlocking arrangement between projections 86, 87 and bayonet type flange on a fuel tank is known in the art (see for example small (e.g. 5 hp or 13,238 kilojoules) engines sold under the marks Briggs®, Honda@, and Kawasaki®.

FIGS. 13A, 13B and 13C show a Briggs® type cap arrangement. Cap 19B has top 90, annular skirt 91 that joins top 90 at annular edge 92. Projections 93, 94 connect to fuel tank 14 at a filler flange having a bayonet type mount. Cap 19B has gasket 95.

In FIGS. 12A, 12B and 12C there can be seen magnetic switch 28 (FIG. 12A) used with cap 19B, the use of a photoelectric switch at opening 66 (FIG. 13B) and the use of appendage 46 (FIG. 12C) for use with button switch 48. In FIGS. 13A, 13B and 13C there can be seen magnetic switch 28 (FIGS. 12A), opening 66 with reflector 65 as part of a photoelectric switch, and (in FIG. 12C) an appendage 46 for use with button switch 48.

FIGS. 12A, 12B, 12C 13A, 13B and 13C illustrate that a bayonet type filler cap and tank flange arrangement could be used with any of the embodiments of FIGS. 1–11.

Figure 14:
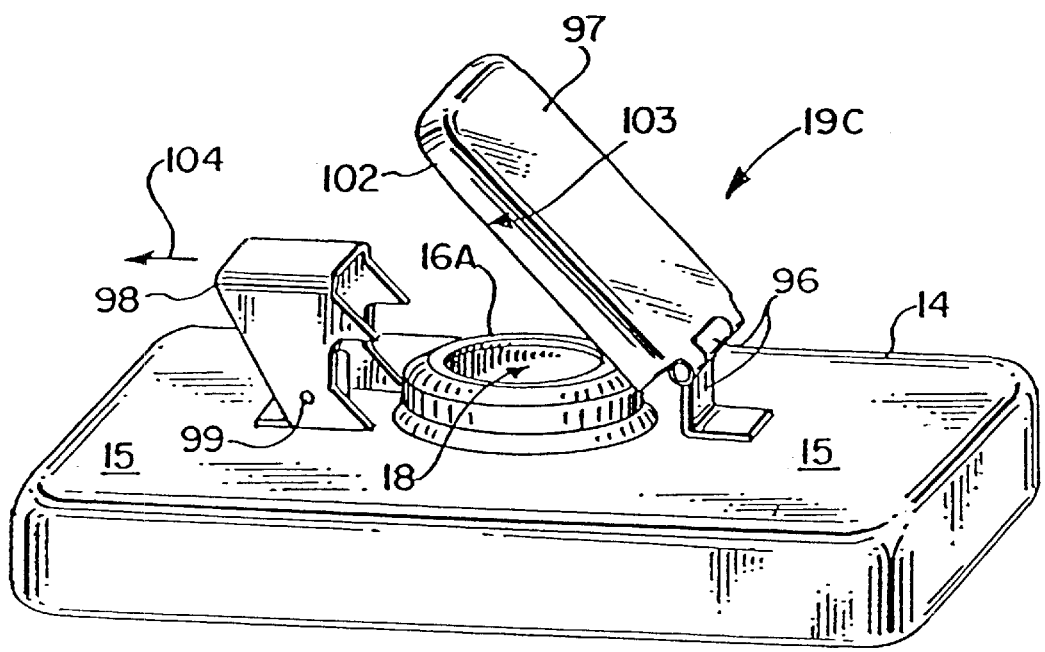
FIGS. 14–15 are perspective views of a hinged filler cap construction that can be used with the embodiment of FIGS. 1–11, showing closed and open positions respectively of the filler cap.
Figure 15:
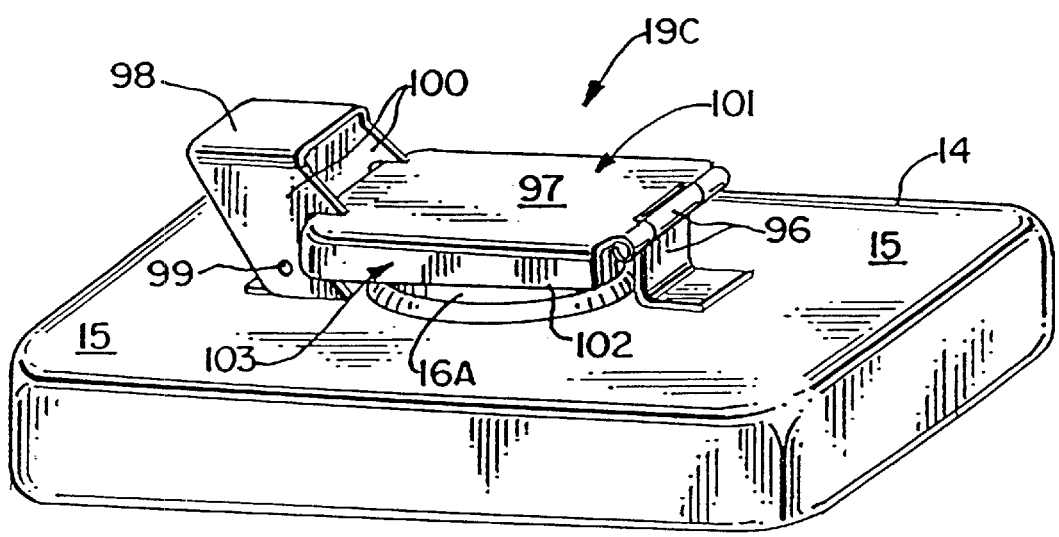

In FIGS. 14 and 15 there is shown a hinged filler cap 19C arrangement that can be used with any of the embodiments of FIGS. 1–11. Hinge 96 supports spring loaded cap 97 that automatically springs open to the open position of FIG. 14 when spring loaded latch 98 is moved away from cap 97 in the direction of arrow 104. Latch member 98 is pivotally mounted to tank surface 15 at pivot 99. A pair of sears 100 normally hold cap 97 in the closed position of FIG. 15. When the cap 97 is closed, sears 100 are engaged and latch 98 pushed away in the direction of arrow 104 until cap 97 closes fully upon flange 16A at which time sears 100 engage and hold cap 97. This general concept of a cap 97, hinge 96, latch 98 and flanged opening 16A, 18 is known and commercially available. Cap 97 has flat top 101, skirt 102 and skirt outer surface 103.

Following the teachings of the present invention, cap 97 could carry a magnet 25 that cooperates with switch 28 as in FIGS. 1–3. The cap 97 could carry a projection or appendage 46 as with the embodiment of FIGS. 4, 5A and 5B that cooperates with button switch 48. The cap 97 could also carry reflector 66 in opening 65 for use with photo electric switch 61 as in FIGS. 6–7.

Any of the cap constructions shown in FIGS. 12A, 12B, 12C, 13A, 13A, 13B and 13C or 14–15 can be used in combination with the micro switch arrangement of FIGS. 8–11.

Figure 16:
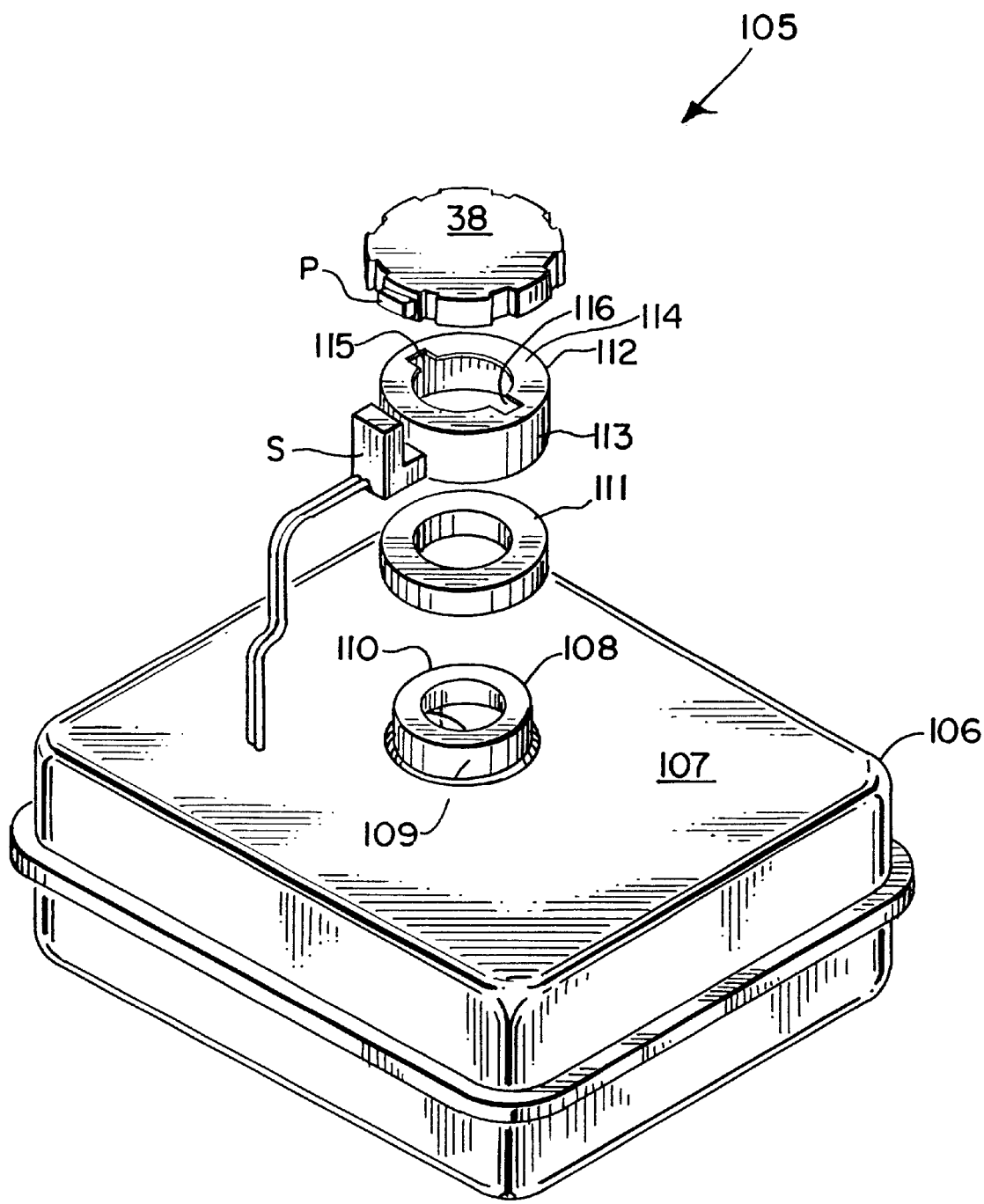
FIG. 16 is an exploded view of a fifth embodiment of the apparatus of the present invention.

FIG. 16 shows a fifth embodiment of the apparatus of the present invention designated generally by the numeral 105. In FIG. 16, fuel tank 106 has an upper surface 107 with a fuel filler neck 108. In the embodiment of FIG. 16, a fuel filler neck 112 can be added to the existing fuel filler neck 108 on tank surface 107. As an option, an adapter 111 can be placed in between the permanent fuel filler neck 108 of tank surface 107 and the retrofitted fuel filler neck 112. The adapter 111 can be a cylindrically shaped or donut shaped fitment or shim that fits in between the side wall 109 of filler neck 108 and the new filler neck 112.

Filler neck 108 has an annular shoulder 110 that surrounds a central opening through which fuel can be added to the tank surface 107. The new filler neck 112 has a side wall 113 and an upper annular shoulder 114 that carries a pair of spaced apart slots 115, 116. These slots 115, 116 receive projections 86, 87 of the fuel filler cap 38 shown in FIGS. 12A, 12B, 12C or the filler cap 90 shown in FIGS. 13A, 13B, 13C.

Figure 17:
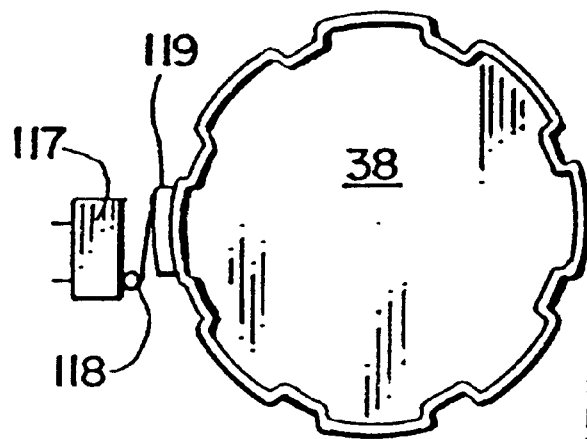
FIG. 17 is a fragmentary plan view of the fifth embodiment of the apparatus of the present invention showing a micro switch type switch arrangement.
Figure 18:
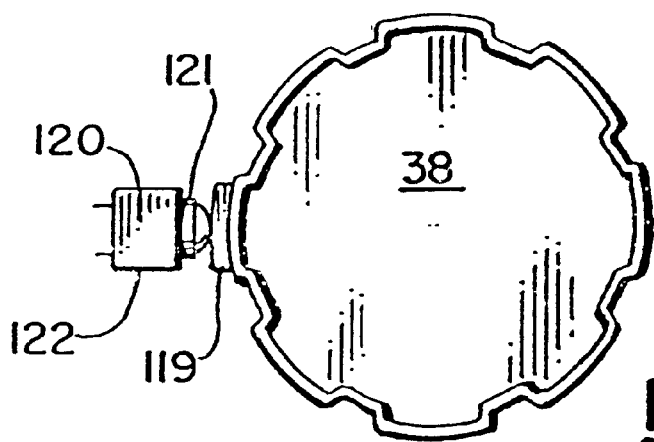
FIG. 18 is a fragmentary plan view of the fifth embodiment of the apparatus of the present invention shown with a plunger switch type switch arrangement.
Figure 19:
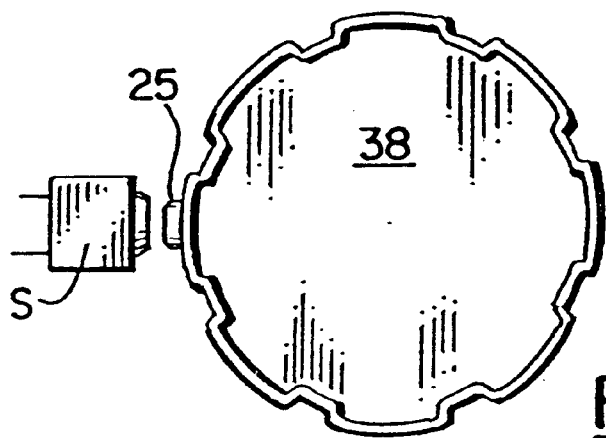
FIG. 19 is a fragmentary plan view of the fifth embodiment of the apparatus of the present invention shown with a magnetic switch, proximity switch, or optical switch arrangement.

The switch S in FIG. 16 schematically represents any of the selected switches that are discussed herein with respect to the embodiments of FIGS. 1–15, or any of the switches shown in FIGS. 17–19. Similarly, the projection P in FIG. 16 represents the portion of an overall switch arrangement that is carried at the periphery of a cap 19, 38 or 90, for any of the embodiments of FIGS. 1–15 or 17–21 B.

In FIG. 17, a micro switch 117 is shown that cooperates with a projection 119 carried by cap 38 at the periphery of cap 38. The micro switch 117 has an arm 118 that is depressed in order to close the switch when the cap 38 is in a fully closed position engaging a fuel filler neck such as 112 or 16.

In FIG. 18, a plunger type switch arrangement is shown that includes a plunger type switch 120 having a housing 122 that carries a plunger 121. The plunger 121 closes relative to the housing 122 when it is depressed by projection 119. The projection 119 is carried at the periphery of cap 38 or any of the other fuel filler caps disclosed herein when the cap 38 is in its, fully closed position. The switch 120 opens to shut down the engine when the projection 119 is moved away from plunger 121.

In FIG. 19, a projection 25 at the periphery of cap 38 can be a portion that cooperates with a magnetic switch, proximity switch, or optical switch, designated generally by the letter S in FIG. 19.

Figure 20A:
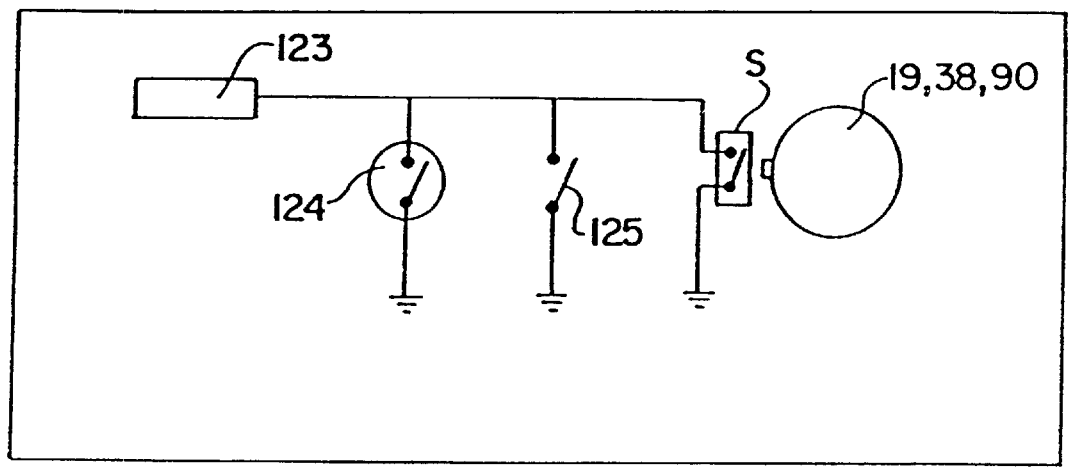
FIGS. 20A–20B are schematic wiring diagrams of the fifth embodiment of the apparatus of the present invention respectively showing ignition system on and ignition system off wiring diagrams.
Figure 20B:
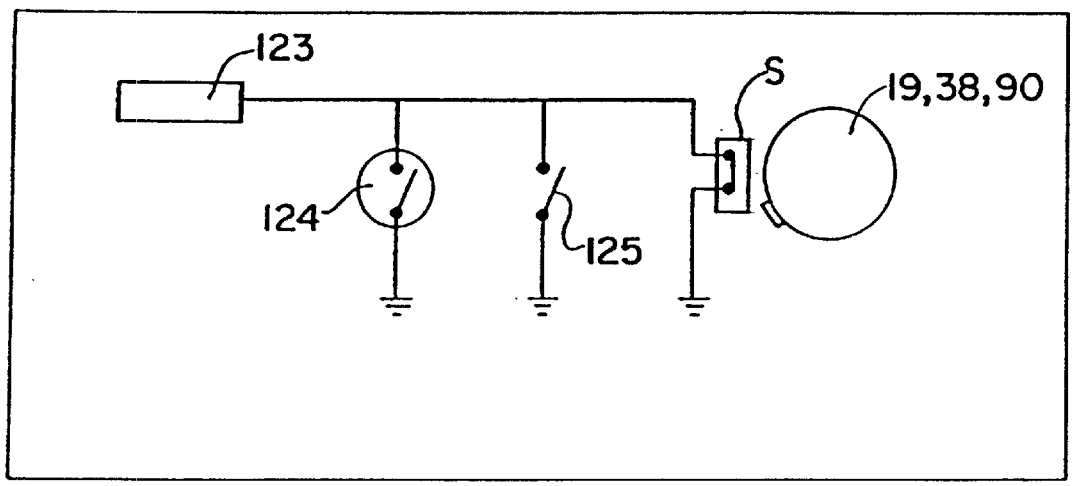

In FIGS. 20A and 20B, there is shown a wiring diagram for a ground to shut down arrangement. In FIG. 20A, an ignition system is indicated by the numeral 123 and key switch by the numeral 124. The numeral 125 indicates schematically any other ignition shut down switch. In FIG. 20A, the engine will not run if any switch is closed. Removing the fuel cap 19, 38 or 90 closes the switch S so that the engine will not run. All of the switches are wired and parallel to each other in FIG. 20A.

In FIG. 20B, the ignition system is shown in an off position. The fuel cap switch S is closed when the cap 19, 38 or 90 is not secured to the tank, and the engine will not run. The fuel cap system shown in FIG. 20B will work on any type of ignition system/shut off system including magneto type, coil type, negative and positive ground, ground to run and ground to shut down.

Figure 21A:
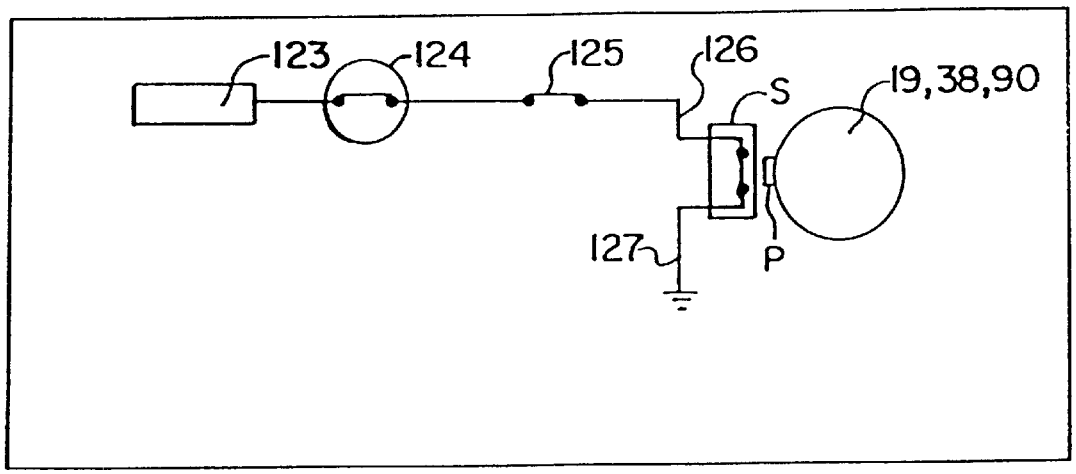
FIGS. 21A–21B are alternate circuit drawings showing an ignition system for the present invention in respective "on" and "off" positions.
Figure 21B:
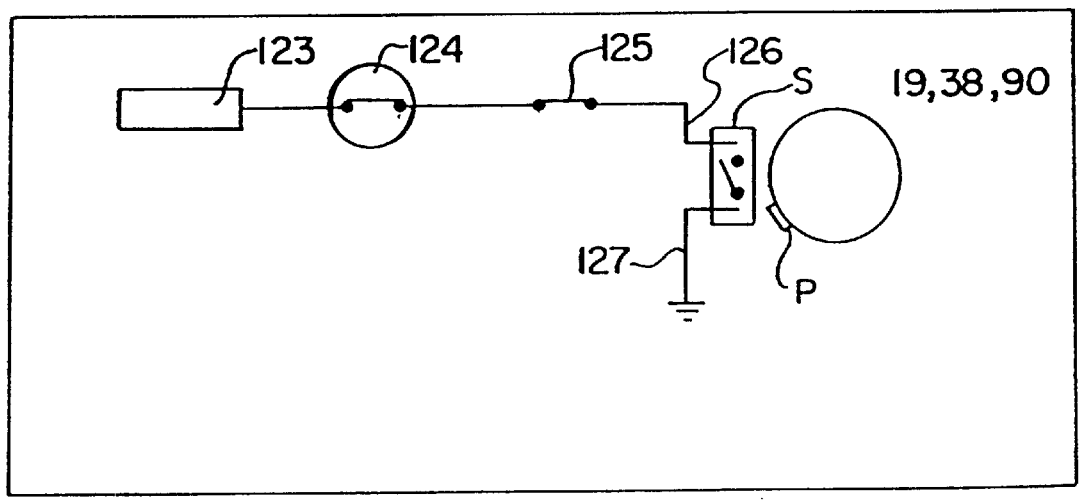

FIGS. 21A and 21B show other examples of wiring diagrams for "ignition system on" and "ignition system off" configurations respectively.

Figure 24:
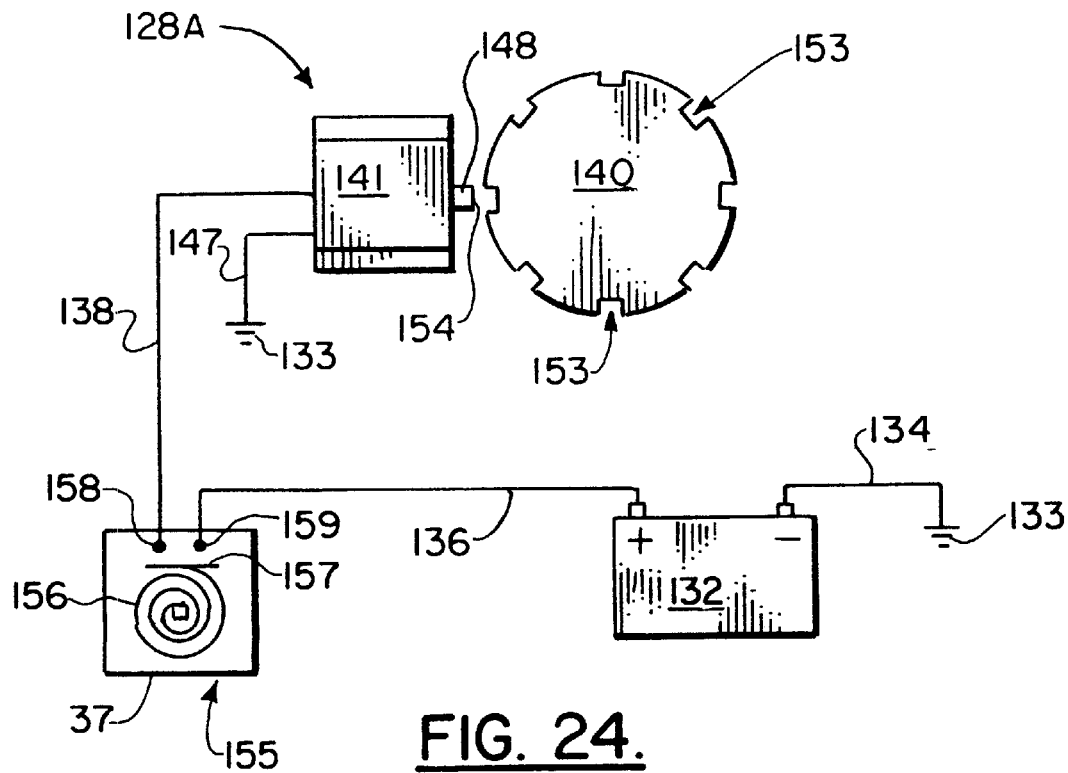
FIG. 24 is a schematic top view of the sixth embodiment of the apparatus of the present invention showing the cap in an unlocked position.

FIGS. 22–24 show a sixth embodiment of the apparatus of the present invention designated generally by the numeral 128 in FIG. 22. Safety fuel tank and cap apparatus 128 in FIG. 22 is used with an internal combustion engine 129, such as a lawn mower engine having a starter 130, starter solenoid 131, and powered by battery 132.

Engine 129 has a fuel tank 139 that is often closely positioned to the engine block 129A of engine 129. Fuel tank 139 has an opening for enabling fuel to be added, and a fuel filler closure cap 140 that can seal the fuel tank opening. This overall arrangement of engine 129, battery 132, fuel tank 139 is the same for all embodiments.

Wiring interconnecting battery 132, engine 129 and the remaining components of the apparatus 128 of the present invention are shown in FIG. 22. Such wiring includes ground 133 that communicates with battery 132 via battery cable 134 and cable 135 that communicates with starter solenoid 131. Cable 136 extends between battery 132 and heat sensor 137. A cable is also provided that links starter 130 and starter solenoid 131.

Cable 138 extends between heat sensor 137 and actuator 141. Actuator 141 is preferably mounted upon fuel tank 139 next to fuel filler cap 140 as shown in FIG. 22. The actuator 141 defines a locking mechanism that prevents the filler cap 140 from being removed when the engine temperature is above a predetermined temperature that is near or below the ignition temperature of the fuel (or fuel vapor) in and around tank 139.

Figure 25:
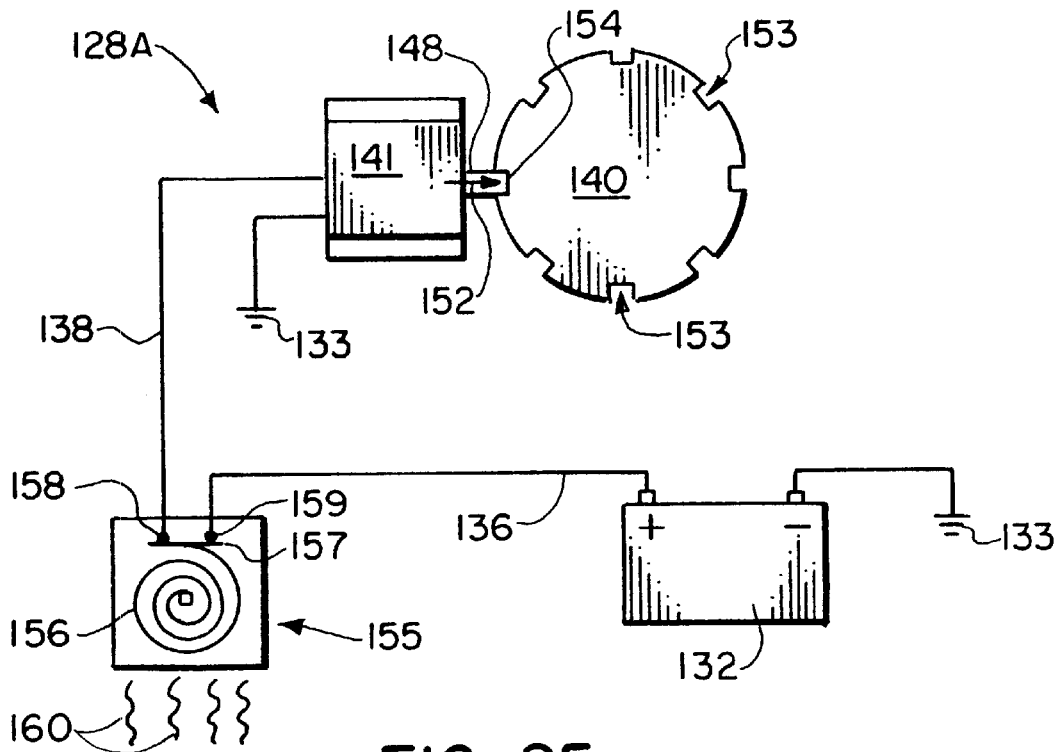
FIG. 25 is a schematic top view of the sixth embodiment of the apparatus of the present invention showing the cap in a locked position.

Actuator 141 includes switch housing 142 having a housing interior 143 that contains plunger 148, as shown in FIGS. 24 and 25. Wire lead 26 is contained within cable 20 for supplying electrical power to actuator 23 as shown in FIGS. 24 and 25. Wire lead 144 connects to coil 146 at terminal 145. Coil 146 is preferably grounded, eg. with wire lead 147 to switch housing 142.

Plunger 148 moves between locked and unlocked positions. FIG. 23A shows the unlocked position of plunger 148. FIG. 23B shows the locked position of plunger 148. Plunger 148 is mounted within housing interior 143 through an opening at the center of coil 146. One end of plunger 148 is supported by flange 149 and spring 150. The other end of plunger 148 is supported by housing 142 at the opening through which plunger 148 extends. The actuator 141 functions as a solenoid to move the plunger 148 between locking and unlocking positions. Spring 150 normally holds plunger 148 in the unlocked position of FIG. 23A. The spring 150 extends between anchor plate 151 and plunger 148 at flange 149.

Cap 140 has a plurality of circumferentially spaced radially extending recesses 153, each sized and shaped to form a connection with plunger 148 at end portion 154. In FIG. 23A, arrows 152 indicate the movement of plunger 148 from an unlocked position to a locked position. During operation, heat sensor 137 monitors the temperature of engine 129. When the temperature of engine block 129A of engine 129 reaches a predetermined temperature that is at or near the ignition temperature of gasoline, heat sensor 137 sends an electrical signal via wire lead 144 to actuator 141 activating coil 146 to move plunger 148 to the locked position of FIG. 23B. When the temperature sensed by heat sensor 137 drops below a predetermined acceptable temperature value, the heat sensor 137 halts the electrical flow to actuator 141 so that return spring 150 moves plunger 148 to the unlocked position of FIG. 23A.

FIGS. 24 and 25 show the sixth embodiment 128A of the apparatus of the present invention using switch 155. Switch 155 is in the form of a coil 156 having contact bar 157. A pair of terminals 158, 159 are positioned next to contact bar 157 as shown in FIGS. 24 and 25. When excessive heat, indicated by heat wave lines 160 in FIG. 25 is transferred to switch 155, coil 156 expands, pushing contact bar 157 into contact with terminals 158, 159. As the circuit is closed, battery 132 is able to supply power to actuator 141, closing a circuit activating plunger 148 and engaging the projecting portion 154 into a recess 153 of cap 140 as indicated by arrow 152 in FIG. 25.

Figure 26A:
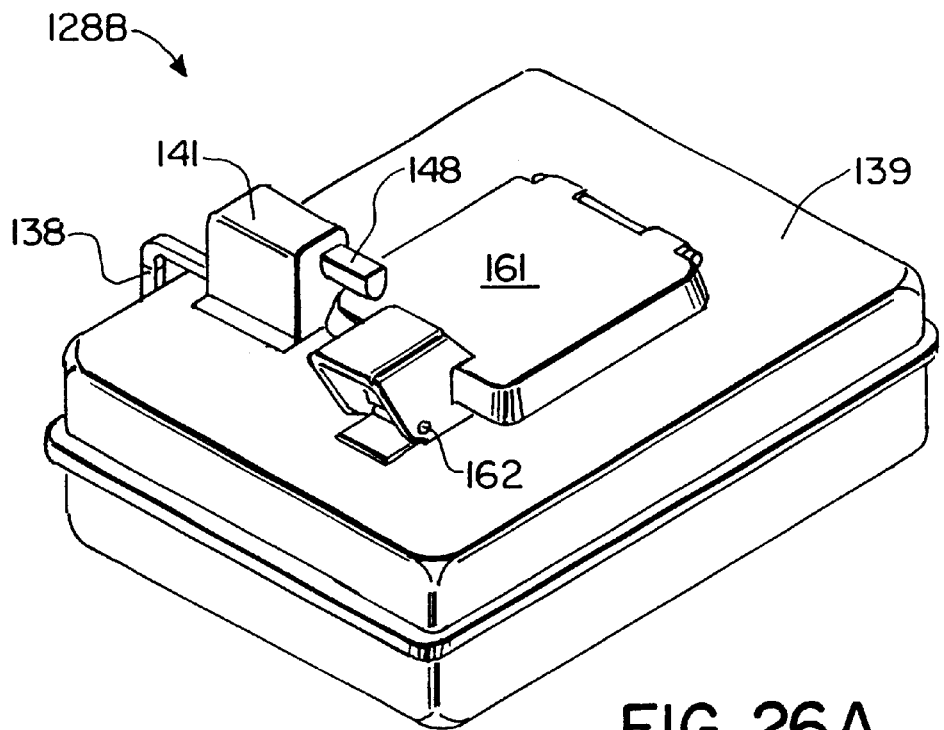
FIGS. 26A–26B are perspective views of a seventh embodiment of the apparatus of the present invention.
Figure 26B:
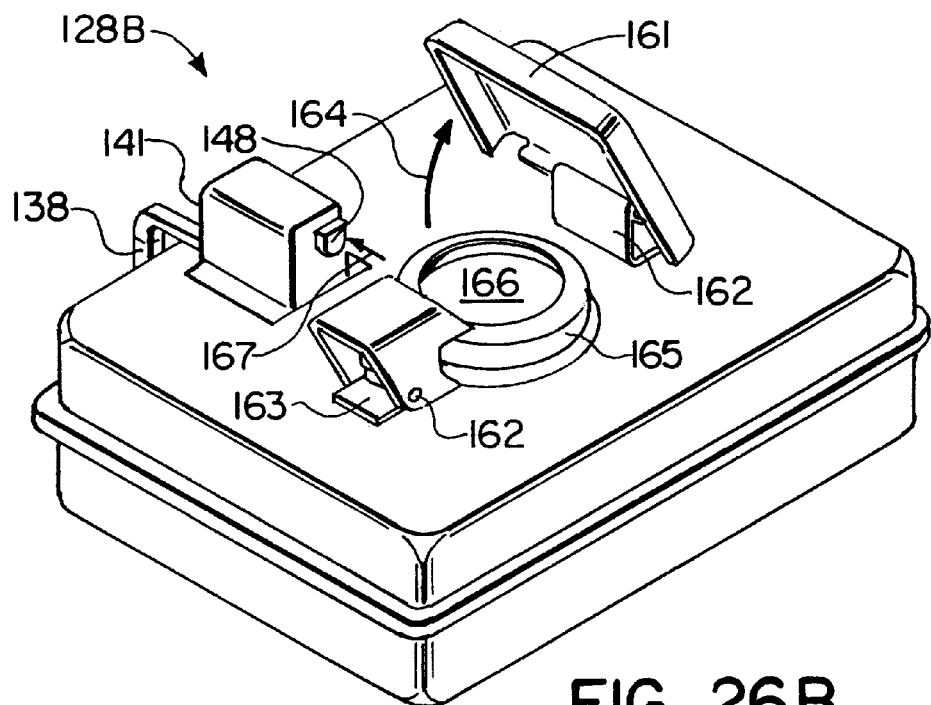

Another (seventh) embodiment of the apparatus 128B of the present invention is shown in FIGS. 26A and 26 B. In FIGS. 26A and 26B, cap 161 is mounted upon hinge 162 to move between open and closed positions as indicated by arrow 164 in FIG. 26B. Latch 163 can be used to latch cap 161 in the closed position of FIG. 26A. The latch 163 can be depressed to open cap 161 as shown in FIG. 26B. Cap 161 closes opening 166 that is surrounded by filler neck 165. In the embodiment of FIGS. 26A and 26B, the actuator 141 and its plunger 148 are operated in the same fashion as shown and described herein relative to FIGS. 24 and 25. However, in FIGS. 26A and 26B, the plunger 148 simply extends over the top of cap 161 preventing it from opening. In FIG. 26A, when the plunger 148 is retracted as indicated by arrow 167, cap 161 can be opened.

Figure 27:
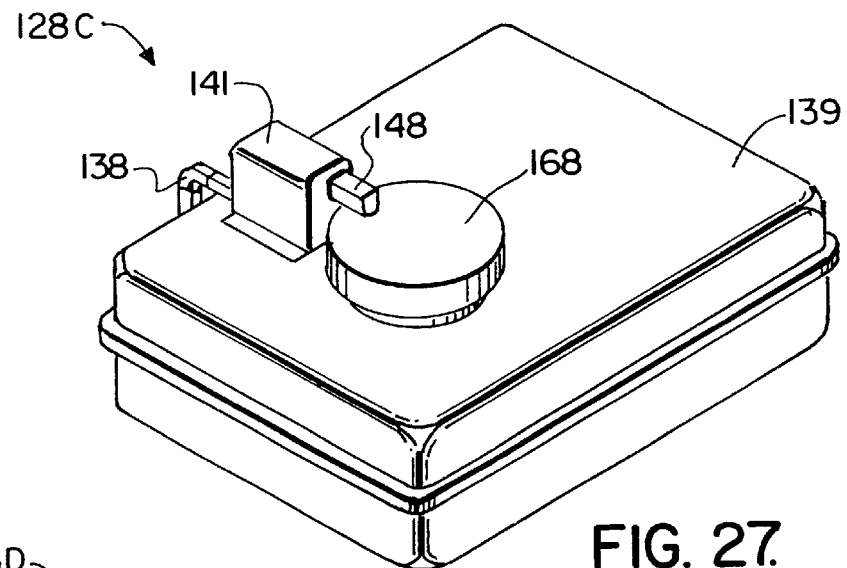
FIG. 27 is a perspective view of an eighth embodiment of the apparatus of the present invention.

In the embodiment of FIG. 27, apparatus 128C includes cap 168 which is internally threaded and having threads that engage the external threads of a filler neck on fuel tank 139. As with the embodiment of FIGS. 26A and 26B, the embodiment of FIG. 27 extends the plunger 148 into a locking position to prevent a user from unthreading the cap 168 from its filler neck until the engine 11 has cooled below the desired temperature.

Figure 28A:
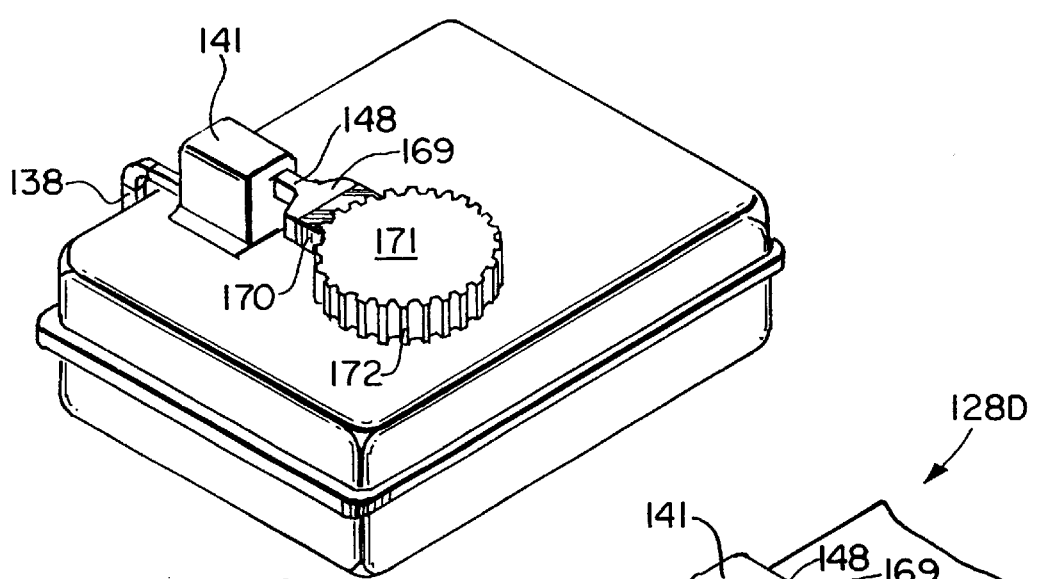
FIGS. 28A–28B are perspective fragmentary views of a ninth embodiment of the apparatus of the present invention.
Figure 28B:
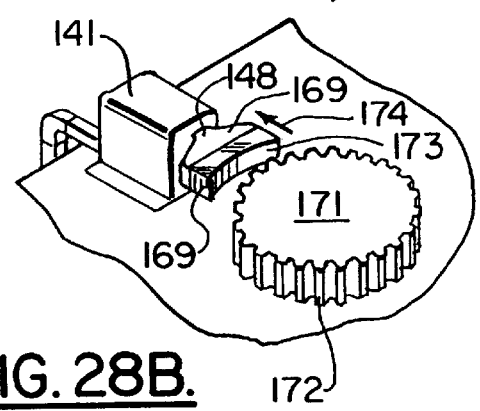

In FIGS. 28A and 28B, another embodiment of the apparatus of the present invention is shown, designated as 128D. In FIGS. 28A and 28B, the plunger 148 carries an enlarged end portion 169 having a rubber or resilient contact member 170. The rubber contact member 170 engages ribbed cap 171. The ribs 172 are sharp so that they are gripped by the resilient or rubber contact member 170 that conforms generally to the ribs 172.

The contact member 170 has a concave surface 173 that generally fits the contour of the external surface of the cap 171. In FIG. 28B, arrow 174 indicates movement of plunger 148 to an unlocked position.

Figure 29:
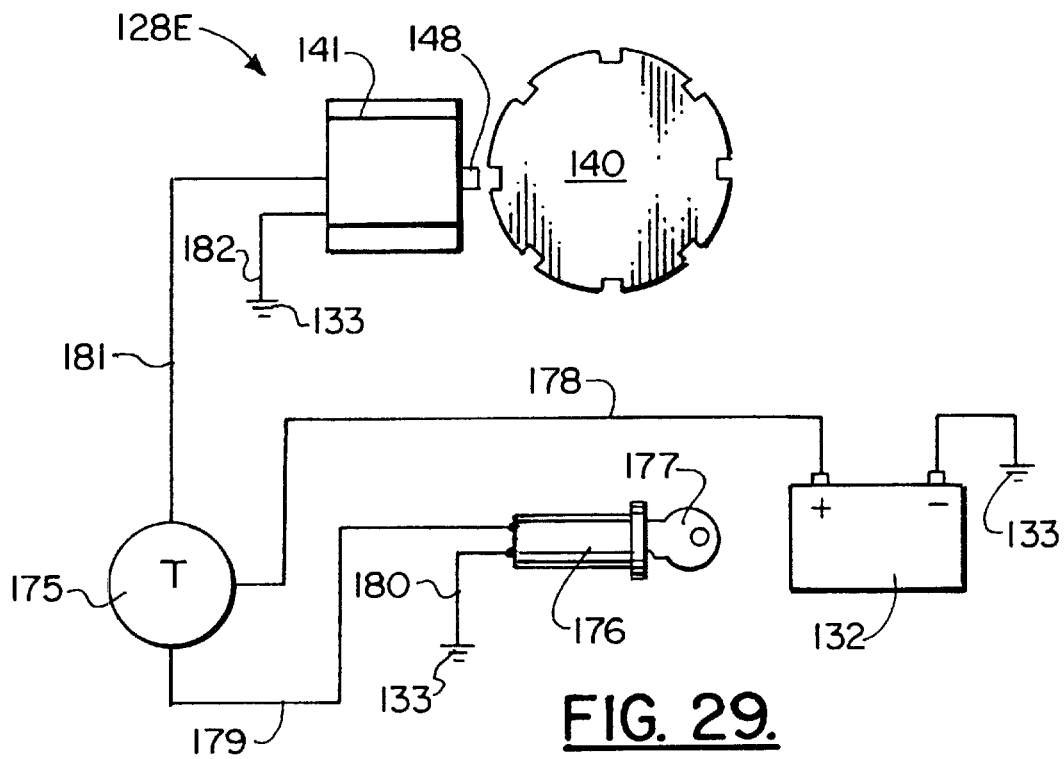
FIG. 29 is a schematic view of a tenth embodiment of the apparatus of the present invention.

In the embodiment of FIG. 29, the apparatus 128E includes a timer arrangement used in concert with the actuator 141 of FIGS. 23A and 23B for locking fuel cap 140 until the temperature of the engine block 129A of engine 129 has cooled. In FIG. 29, a timer 175 locks the cap 140 until a sufficient amount of time has lapsed (2–5 minutes) so that the cap can be removed without a danger of explosion or fire. In FIG. 29, key switch 176 has key 177 for operating engine ignition and timer 175. When key 177 is turned to the "on" position, a timer circuit activates actuator 141 so that plunger 148 is moved to the locked position, and remains locked as long as the key is in the on position. When key 177 is turned to the "off" position, timer 175 is activated to keep plunger in locked position. After a desired time interval of two to five minutes, for example, timer 175 halts the flow of electricity from battery 132 to actuator 175 so that its return spring 150 (see FIGS. 23A–23B) moves the plunger 148 to the unlocked position shown in FIG. 29. Wire cables 178–182 are shown in FIG. 9 interfacing battery 132, lock 176, timer and actuator 141.

Figure 30:
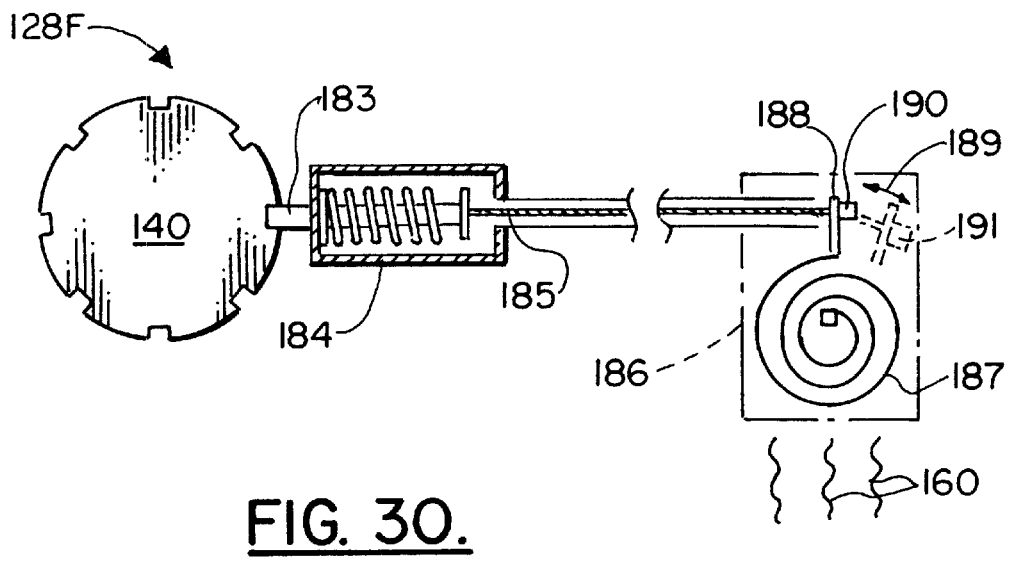
FIG. 30 is an schematic view of an eleventh embodiment of the apparatus of the present invention.

In FIG. 30, the apparatus 128 F includes plunger 183 that is manually operated using heat sensitive coil 187. Plunger 183 is mounted in switch housing 184. Plunger 183 is attached to cable 185. The cable 185 extends out of the switch housing 184 to engage radial arm 188 of coil 187. Coil housing 186 contains coil 187 and also provides a stop for limiting movement of free end 187 of radial arm 188.

Arrow 189 in FIG. 30 indicates the movement of radial arm 188 and its free end 190 between a locking position shown in hard lines in FIG. 30 and an unlocked position shown in phantom lines in FIG. 30.

Figure 9:
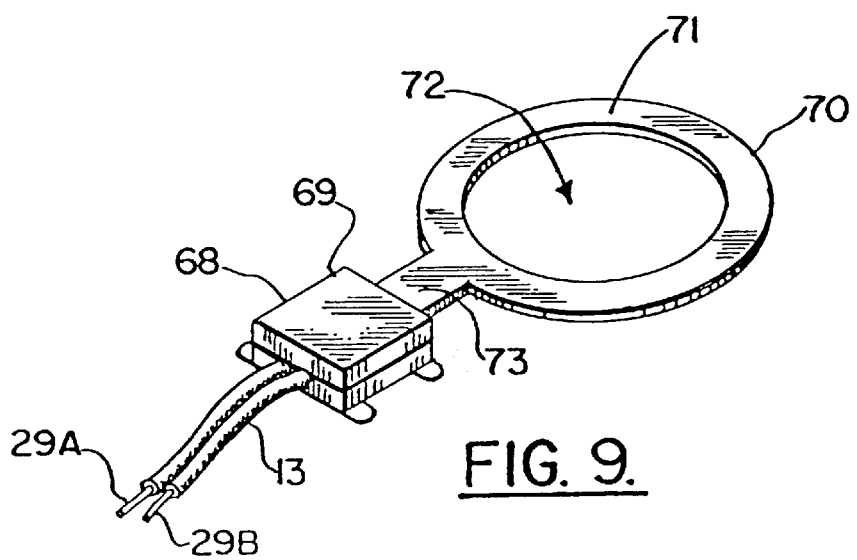
FIG. 9 is a partial perspective view of the fourth embodiment of the apparatus of the present invention.

In FIG. 9, the heat indicated by waves 160 causes coil 187 to expand to the locked position shown in FIG. 30. When the heat of the engine reduces to an acceptable temperature level, coil 187 cools and contracts, moving radial arm 188 to the unlocked position shown in phantom lines in FIG. 30, and pulling cable 185 and plunger 183 with it.

PARTS LIST

The following is a list of parts and materials suitable for use in the present invention:

| NUMBER | PART |
| --- | --- |
| 10 | safety fuel tank and cap apparatus |
| 11 | magnetoelectric generator |
| 12 | pull cord starter rope |
| 13 | electric cable |
| 14 | fuel tank |
| 15 | upper surface |
| 16 | cylindrically shaped flange |
| 16A | cylindrically shaped flange |
| 17 | external thread |
| 18 | opening |
| 19 | filler cap |
| 19A | filler cap |
| 19B | filler cap |
| 19C | hinged filler cap |
| 20 | annular skirt |
| 20A | inner annular surface |
| 20B | outer annular surface |
| 21 | top |
| 22 | handle |
| 23 | internal thread |
| 24 | vent |
| 25 | magnet |
| 26 | outer end |
| 27 | inner end |
| 28 | switch |
| 29A | lead |
| 29B | lead |
| 30 | ground |
| 31 | arrow |
| 32 | arrow |
| 33 | spring |
| 34 | contact plate |
| 35 | contact point |
| 36 | contact point |
| 37 | annular edge |
| 38 | circular cap |
| 39 | annular skirt |
| 40 | safety fuel tank and cap apparatus |
| 41 | cap |
| 42 | handle |
| 43 | vent |
| 44 | annular skirt |
| 45 | top |
| 46 | appendage |
| 47 | undersurface |
| 48 | button switch |
| 49 | contact |
| 50 | contact |
| 51 | spring |
| 52 | contact plate |
| 53 | switch bottom |
| 54 | arrow |
| 55 | arrow |
| 56 | safety fuel tank and cap apparatus |
| 57 | filler cap |
| 58 | annular skirt |
| 59 | top |
| 60 | handle |
| 61 | switch |
| 62 | switch housing |
| 63 | electric eye |
| 64 | arrow |
| 65 | reflector |
| 66 | opening |
| 67 | annular rib |
| 68 | safety fuel tank and cap apparatus |
| 69 | micro switch |
| 70 | switch arm |
| 71 | ring |
| 72 | opening |
| 73 | beam |
| 74 | filler cap |
| 75 | top |
| 76 | annular skirt |
| 77 | handle |
| 78 | shroud |
| 79 | cover |
| 80 | bolt |
| 81 | arrow |
| 82 | fuel line |
| 83 | weed trimmer |
| 84 | annular surface |
| 85 | frame |
| 86 | laterally extending projection |
| 87 | laterally extending projection |
| 88 | outer annular surface |
| 89 | annular edge |
| 90 | circular cap |
| 91 | outer annular surface |
| 92 | annular edge |
| 93 | laterally extending projection |
| 94 | laterally extending projection |
| 95 | gasket seal |
| 96 | hinge |
| 97 | spring loaded cap member |
| 98 | spring loaded latch |
| 99 | pivot |
| 100 | sear |
| 101 | flat top |
| 102 | skirt |
| 103 | outer surface |
| 104 | arrow |
| 105 | safety fuel tank and cap apparatus |
| 106 | fuel tank |
| 107 | upper surface |
| 108 | fuel filler neck |
| 109 | side wall |
| 110 | annular shoulder |
| 111 | adaptor |
| 112 | filler neck |
| 113 | side wall |
| 114 | annular shoulder |
| 115 | slot |
| 116 | slot |
| 117 | micro switch |
| 118 | arm |
| 119 | projection |
| 120 | plunger type switch |
| 121 | plunger |
| 122 | housing |
| 123 | ignition system |
| 124 | key switch |
| 125 | switch |
| 126 | lead |
| 127 | ground |
| P | projection |
| S | switch |
| E | engine |
| 128 | safety fuel tank and cap apparatus |
| 128A | safety fuel tank and cap apparatus |
| 128B | safety fuel tank and cap apparatus |
| 128C | safety fuel tank and cap apparatus |
| 128D | safety fuel tank and cap apparatus |
| 128E | safety fuel tank and cap apparatus |
| 128F | safety fuel tank and cap apparatus |

-continued

| NUMBER | PART |
|---|---|
| 129 | engine |
| 129A | engine block |
| 130 | starter |
| 131 | starter solenoid |
| 132 | battery |
| 133 | ground |
| 134 | battery cable |
| 135 | battery cable |
| 136 | battery cable |
| 137 | heat sensor |
| 138 | cable |
| 139 | fuel tank |
| 140 | fuel cap |
| 141 | actuator |
| 142 | actuator housing |
| 143 | housing interior |
| 144 | wire lead |
| 145 | terminal |
| 146 | coil |
| 147 | wire lead |
| 148 | plunger |
| 149 | flange |
| 150 | spring |
| 151 | anchor plate |
| 152 | arrow |
| 153 | recess |
| 154 | projecting end |
| 155 | switch |
| 156 | coil |
| 157 | contact bar |
| 158 | terminal |
| 159 | terminal |
| 160 | heat |
| 161 | cap |
| 162 | hinge |
| 163 | latch |
| 164 | arrow |
| 165 | filler neck |
| 166 | opening |
| 167 | arrow |
| 168 | cap |
| 169 | enlarged end portion |
| 170 | rubber contact member |
| 171 | ribbed cap |
| 172 | rib |
| 173 | concave surface |
| 174 | arrow |
| 175 | timer |
| 176 | key switch |
| 177 | key |
| 178 | wire cable |
| 179 | wire cable |
| 180 | wire cable |
| 181 | wire cable |
| 182 | wire cable |
| 183 | plunger |
| 184 | plunger housing |
| 185 | cable |
| 186 | coil housing |
| 187 | heat sensitive coil/bi-metal spring |
| 188 | radial arm |
| 189 | arrow |
| 190 | free end |
| 191 | stop position |

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A safety fuel tank and filler cap apparatus for supplying fuel to an internal combustion engine, comprising:

a) an exposed fuel tank having a fill opening, an annular fuel filler flange surrounded by an adjoining fuel tank wall having outer surface, said flange having a central axis;

b) a filler cap having a cap center, the cap being connectable to the fuel filler flange to form a closure of the tank at the fill opening when the cap center generally aligns with the flange central axis, said filler cap and adjoining fuel tank outer surface being configured to enable a user to grip and turn said fuel filler cap, at a position next to the tank wall; and c) a mechanism interfaced between the fuel tank and filler cap that is activated to a safety mode when the engine is at an elevated, operating temperature, said mechanism including a connector that interfaces between the outer surface of the fuel tank and the cap.

2. The apparatus of claim 1 wherein the mechanism includes a switch.

3. The apparatus of claim 2 wherein the switch is a magnetic switch.

4. The apparatus of claim 2 wherein the switch is a photoelectric switch.

5. The apparatus of claim 2 wherein the switch is a mechanical switch that moves between operating and disabled positions, the switch including a member that shifts positions when the fuel filler cap is separated from the fuel filler flange.

6. The apparatus of claim 2 wherein the switch, when activated to a safety mode, moves to a closed position thereby preventing separation of the fuel filler cap from the fuel filler flange.

7. The apparatus of claim 3 wherein the switch includes a magnetic switch mounted on the fuel tank and a magnet mounted on the filler cap.

8. The apparatus of claim 2 wherein the switch includes a switch member mounted on the filler cap that does not interfere with a sealing of the fuel filler flange with the filler cap.

9. The apparatus of claim 8 wherein the fuel filler flange has a threaded portion and the filler cap has a top and an annular skirt with threads thereon that engage the threaded portion of the flange, and wherein the switch member is mounted on the annular skirt in between the threads and the top.

10. The apparatus of claim 8 wherein the filler cap has a top, an annular skirt with internal threads, and an unthreaded outer surface and wherein the switch member is mounted on the annular skirt.

11. The apparatus of claim 8 wherein the filler cap has a top, an annular skirt with internal threads, and an unthreaded outer surface and wherein the switch member is mounted on the top.

12. A safety fuel tank and filler cap apparatus for supplying fuel to and internal combustion engine, comprising:

a) an exposed fuel tank having a fill opening, an annular fuel filler flange surrounded by an adjoining fuel tank outer surface, said flange including a flange wall extending a short distance from the filler opening in said fuel tank wall, said annular flange having a central axis;

b) a filler cap that fits the fuel filler flange to form a closure of the tank at the fill opening, said filler cap having a center, wherein the adjoining fuel tank outer surface is configured to enable a user to grip and turn said fuel filler cap; and c) a mechanism interfaced between the fuel tank and filler cap that alerts a user not to add fuel to the fuel tank if the engine temperature exceeds the fuel ignition temperature for the fuel to be supplied to the engine.

13. A powered implement, comprising:
a) a frame;
b) an internal combustion engine mounted on the frame;
c) an exposed fuel tank having a tank wall with a fill opening, a generally cylindrically shaped fuel filler flange extending from the tank wall and surrounded by an adjoining fuel tank wall outer surface, said flange extending a short distance from the filler opening in said fuel tank wall;
d) a filler cap that fits the fuel filler flange to form a closure of the tank at the fill opening, said filler cap and adjoining fuel tank outer surface being closely positioned, and configured to enable a user to grip and turn said fuel filler cap; and
e) safety interface device interfaced between the fuel tank and filler cap that signals to a user that fuel should not be added to the tank.

14. The apparatus of claim 13 wherein the device is a switch.

15. The apparatus of claim 14 wherein the switch is a magnetic switch.

16. The apparatus of claim 14 wherein the switch is a photoelectric switch.

17. The apparatus of claim 14 wherein the switch is a mechanical switch that moves between operating and disabled positions, the switch including a member that shift positions when the fuel filler cap is separated from the fuel filler flange.

18. The apparatus of claim 14 wherein the switch includes a magnetic switch mounted on the fuel tank and a magnet mounted on the filler cap.

19. The apparatus of claim 13 wherein the switch includes a switch member mounted on the filler cap that does not interfere with a sealing of the fuel filler flange with the filler cap.

20. The apparatus of claim 18 wherein the filler cap has a top, and an annular skirt with internal threads, and wherein the switch member is mounted on the annular skirt in between the threads and the top.

21. The apparatus of claim 18 wherein the filler cap has a top, an annular skirt with internal threads, and an unthreaded outer surface and wherein the switch member is mounted on the annular skirt.

22. The apparatus of claim 18 wherein the filler cap has a top, an annular skirt with internal threads, and an unthreaded outer surface and wherein the switch member is mounted on the top.

23. A powered implement, comprising:
a) a frame;
b) an internal combustion engine mounted on the frame, said engine including a magnetoelectric generator for starting the engine;
c) the frame and engine supporting an exposed fuel tank having a tank wall and a fill opening through said tank wall for receiving fuel for powering the engine;
d) a fuel filler flange on said tank surrounded by an adjoining fuel tank outer surface, said flange extending a short distance from tank wall and surrounding the filler opening;
e) a filler cap that fits the fuel filler flange to form a closure of the tank at the fill opening, said filler cap and adjoining fuel tank outer surface being configured to enable a user to grip and turn said fuel filler cap; and
f) a device interfaced between the fuel tank and filler cap that responds to an attempt by a user to open the filler cap when the engine is at an elevated, operating temperature that is near the ignition temperature of the fuel that powers the engine.

* * * * *